US009384425B2

(12) United States Patent
Hiraki

(10) Patent No.: US 9,384,425 B2
(45) Date of Patent: Jul. 5, 2016

(54) IMAGE PROCESSING METHOD AND IMAGE PROCESSING SYSTEM

(71) Applicant: Oki Data Corporation, Tokyo (JP)

(72) Inventor: Takuya Hiraki, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/028,612

(22) Filed: Sep. 17, 2013

(65) Prior Publication Data

US 2014/0078522 A1    Mar. 20, 2014

(30) Foreign Application Priority Data

Sep. 19, 2012  (JP) ................................ 2012-205327

(51) Int. Cl.
*H04N 1/393*   (2006.01)
*G06K 15/00*   (2006.01)
*G06Q 30/02*   (2012.01)

(52) U.S. Cl.
CPC .............. *G06K 15/005* (2013.01); *G06K 15/40* (2013.01); *G06Q 30/0283* (2013.01); *H04N 1/393* (2013.01)

(58) Field of Classification Search
None
See application file for complete search history.

(56) References Cited

U.S. PATENT DOCUMENTS

| 2005/0207776 A1* | 9/2005 | Nomura ................. G07F 17/26 399/79 |
| 2008/0304091 A1* | 12/2008 | Kobashigawa ........ G03G 15/50 358/1.13 |
| 2009/0016748 A1* | 1/2009 | Ferlitsch ............... G03G 21/02 399/39 |
| 2009/0303499 A1* | 12/2009 | Kang .................. H04N 1/3875 358/1.2 |

FOREIGN PATENT DOCUMENTS

JP            2002-032199 A    1/2002

* cited by examiner

*Primary Examiner* — Tammy Pham
*Assistant Examiner* — Keara Harris
(74) *Attorney, Agent, or Firm* — Mots Law, PLLC

(57) ABSTRACT

An information processor includes a first input unit configured to accept designation of an enlargement/reduction rate, an extraction unit configured to extract a first output setting for printout at the designated enlargement/reduction rate and a second output setting different from the first output setting for printout at the designated enlargement/reduction rate, a calculation unit configured to calculate a first fee for the first output setting and a second fee for the second output setting, a display configured to display the first output setting and the first fee in association with each other, and the second output setting and the second fee in association with each other, a second input unit configured to receive a selection of one of the first output setting and the second output setting, and a controller configured to cause the execution of image formation onto a medium with the selected output setting.

24 Claims, 26 Drawing Sheets

Fig.7

| No. | PAPER STORAGE TRAY | PAPER SIZE | COLOR UNIT PRICE | MONOCHROME UNIT PRICE |
|---|---|---|---|---|
| 1 | TRAY A | A4 | 15 YEN | 10 YEN |
| 2 | TRAY B | A3 | 30 YEN | 20 YEN |
| 3 | TRAY C | A3+ | 40 YEN | 30 YEN |
| 4 | TRAY D | B5 | 12 YEN | 9 YEN |
| 5 | TRAY E | A5 | 10 YEN | 6 YEN |

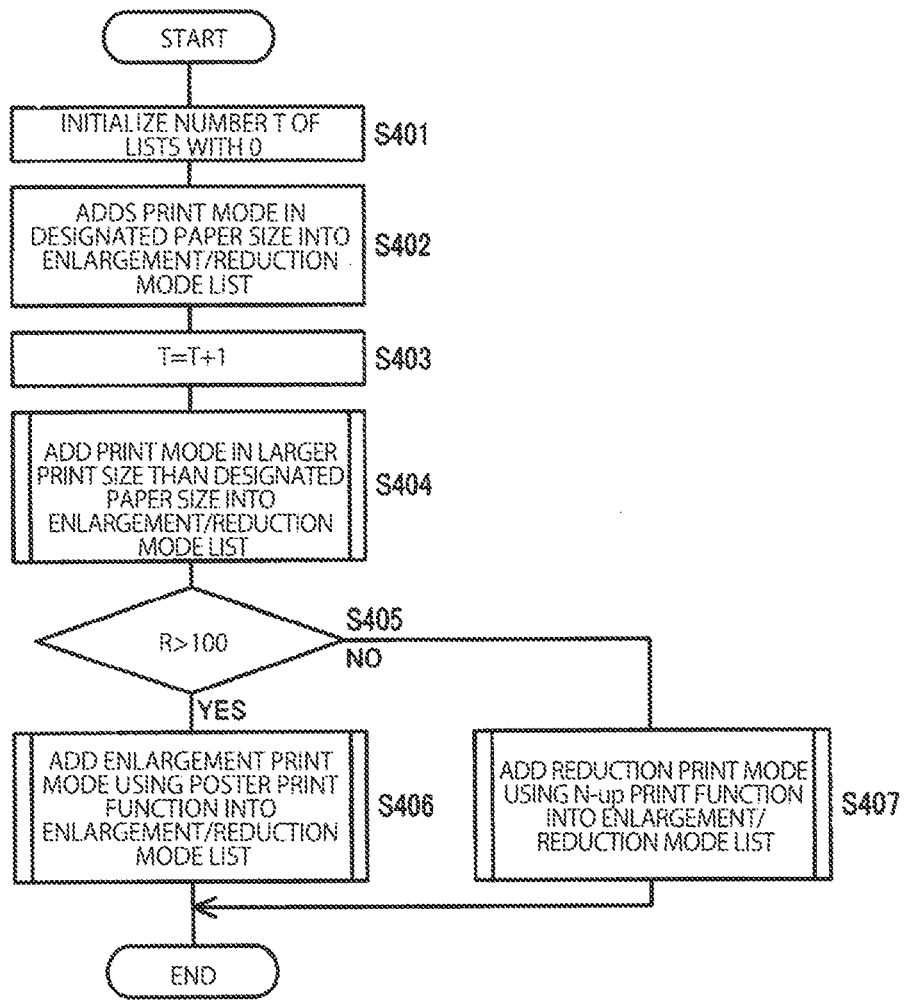

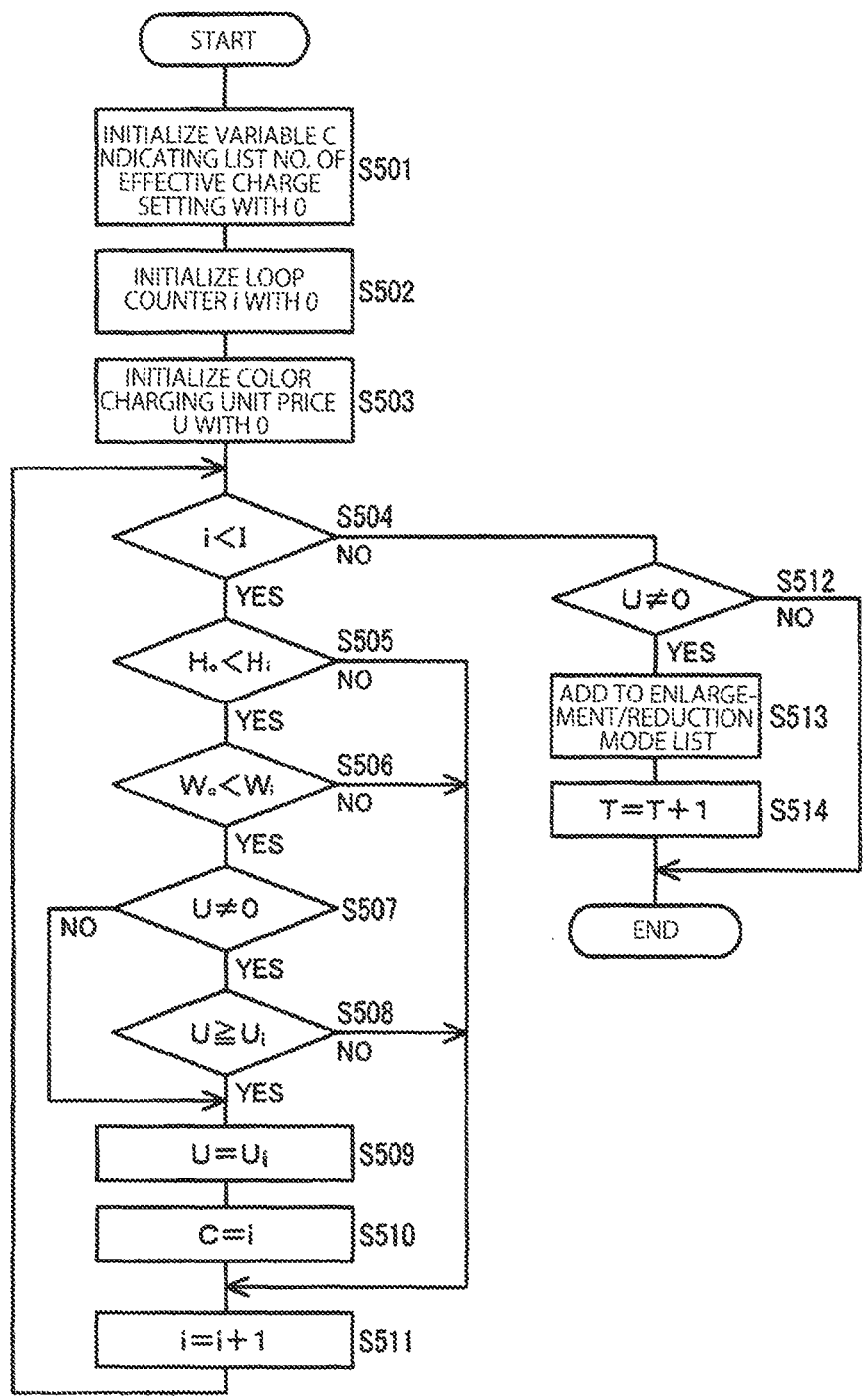

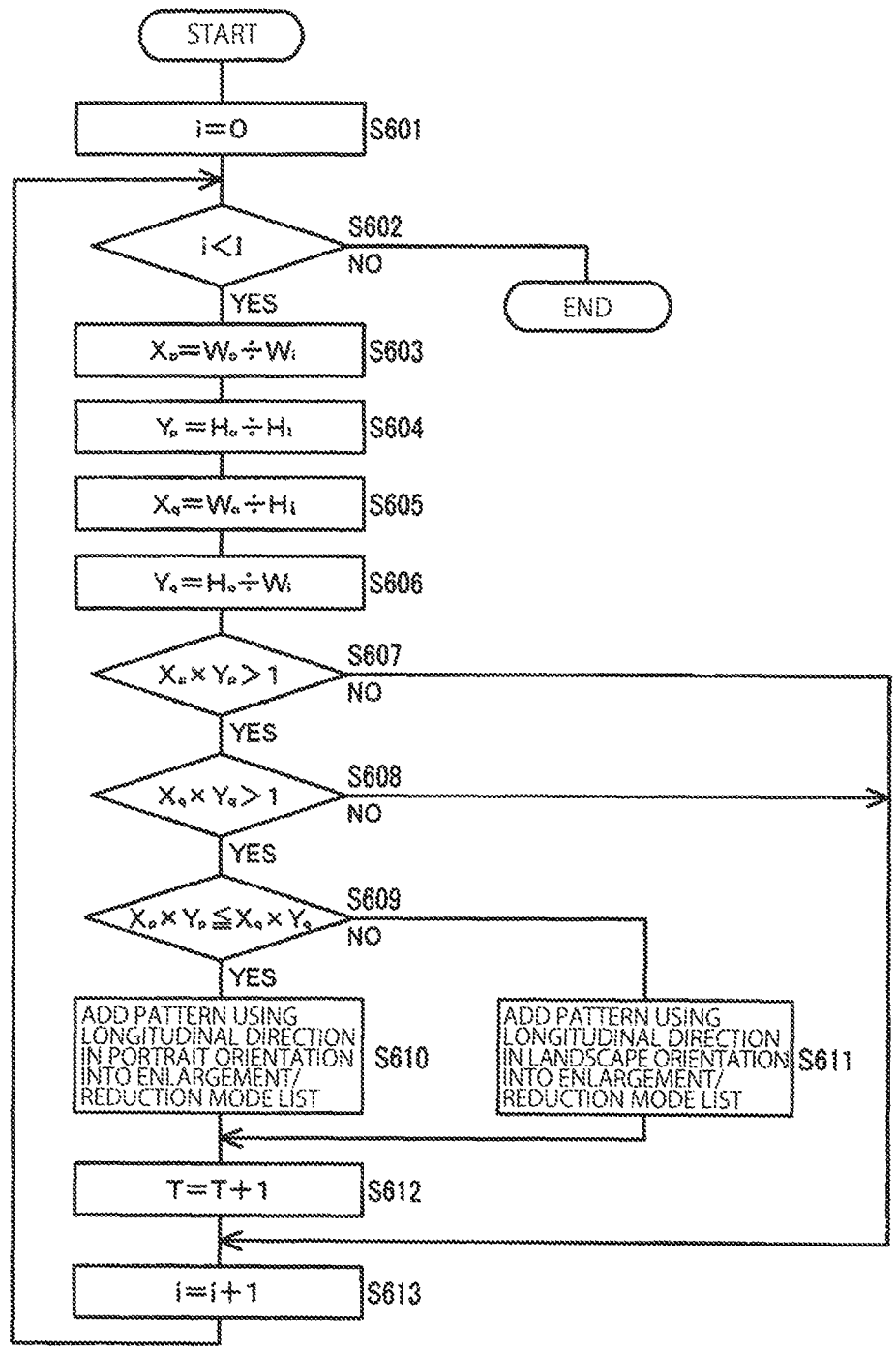

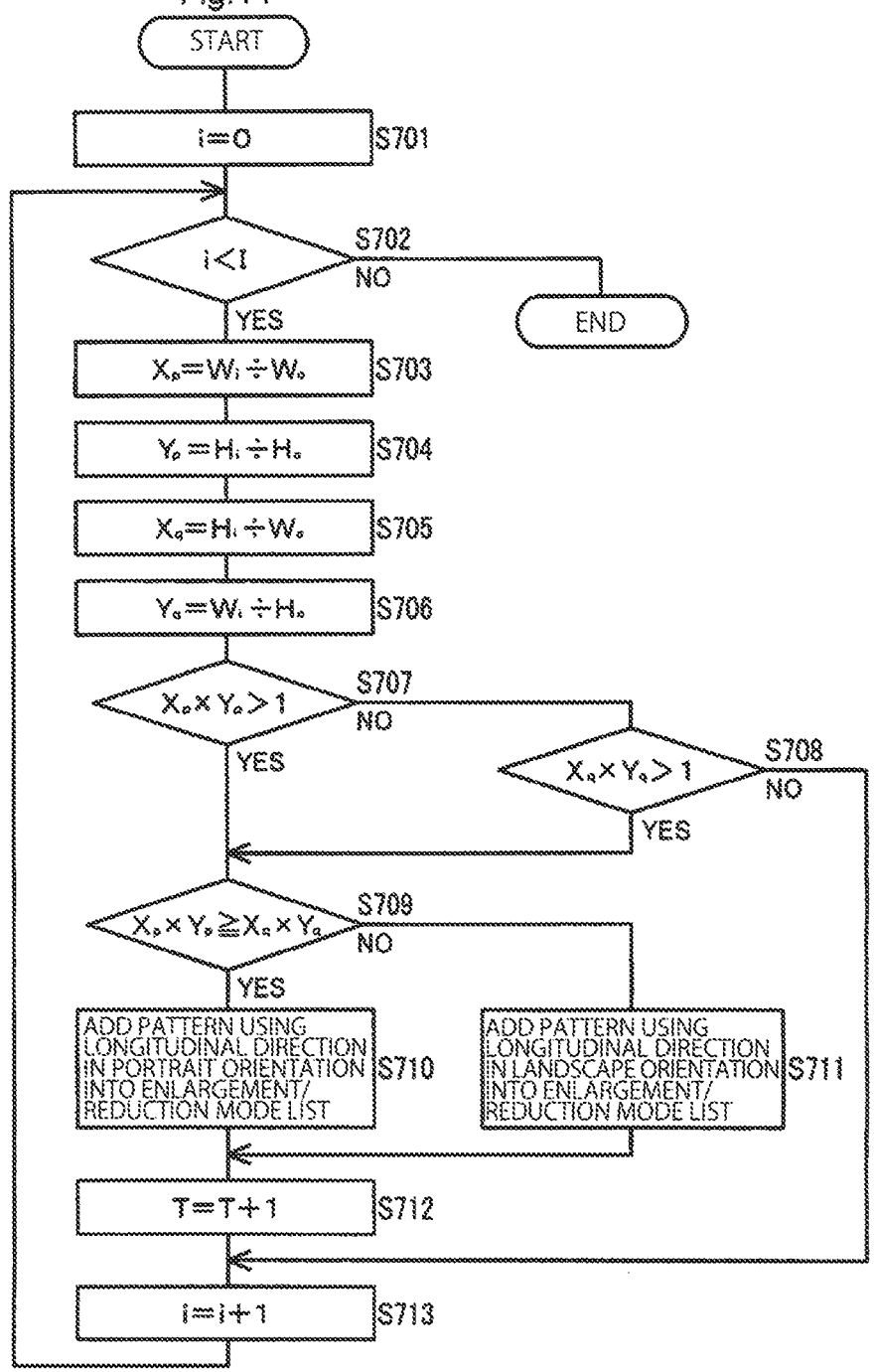

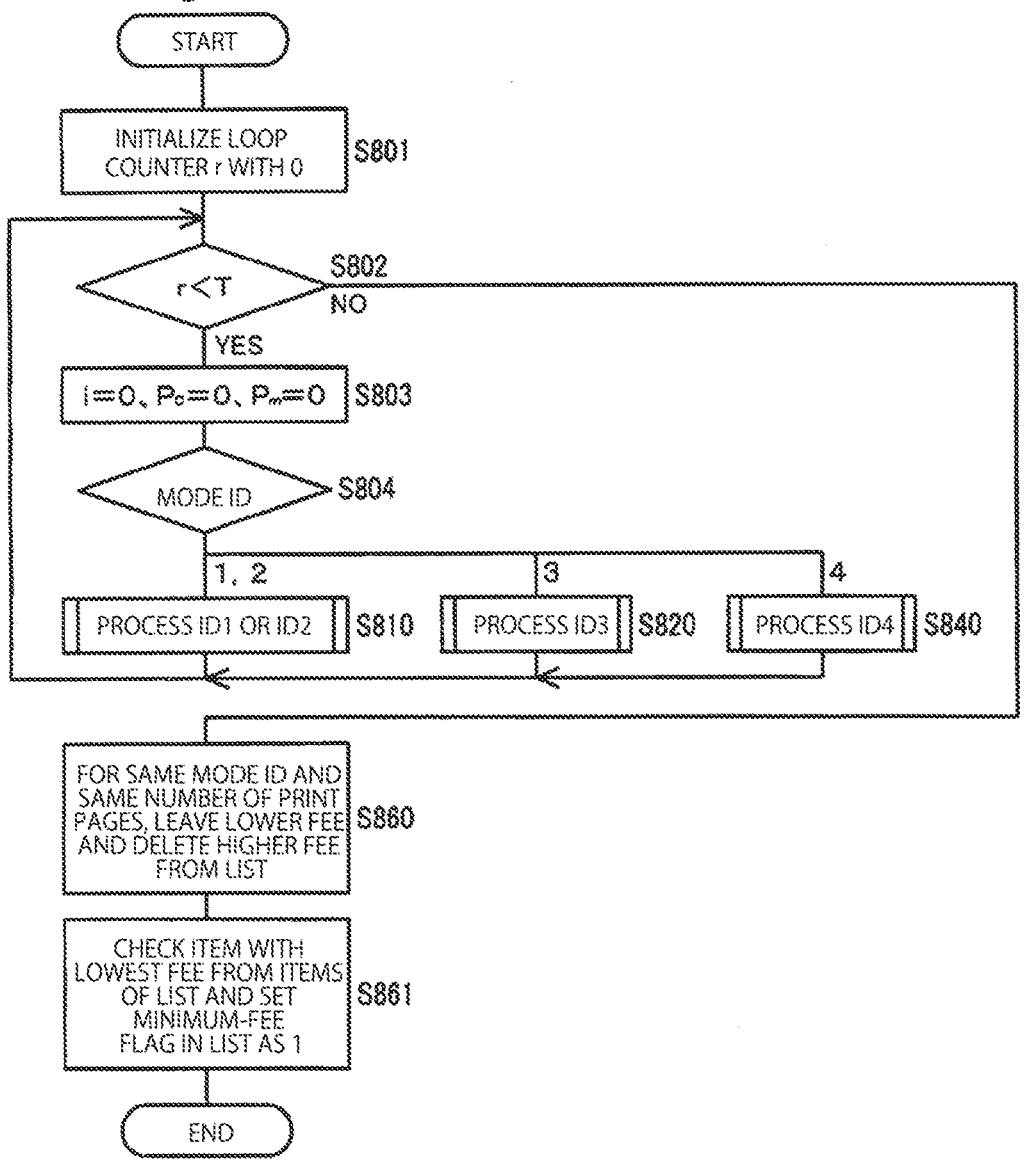

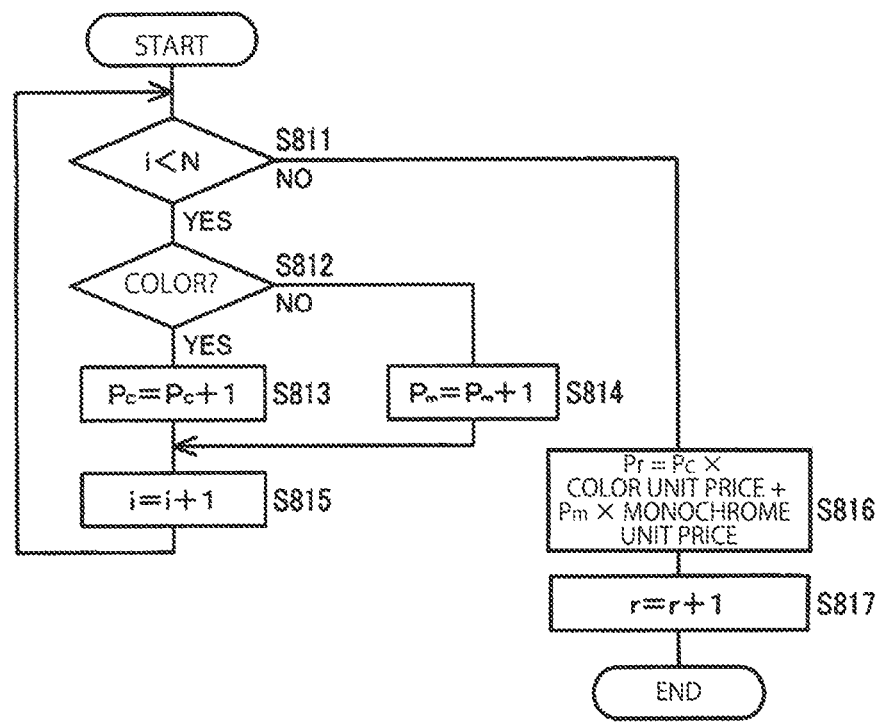

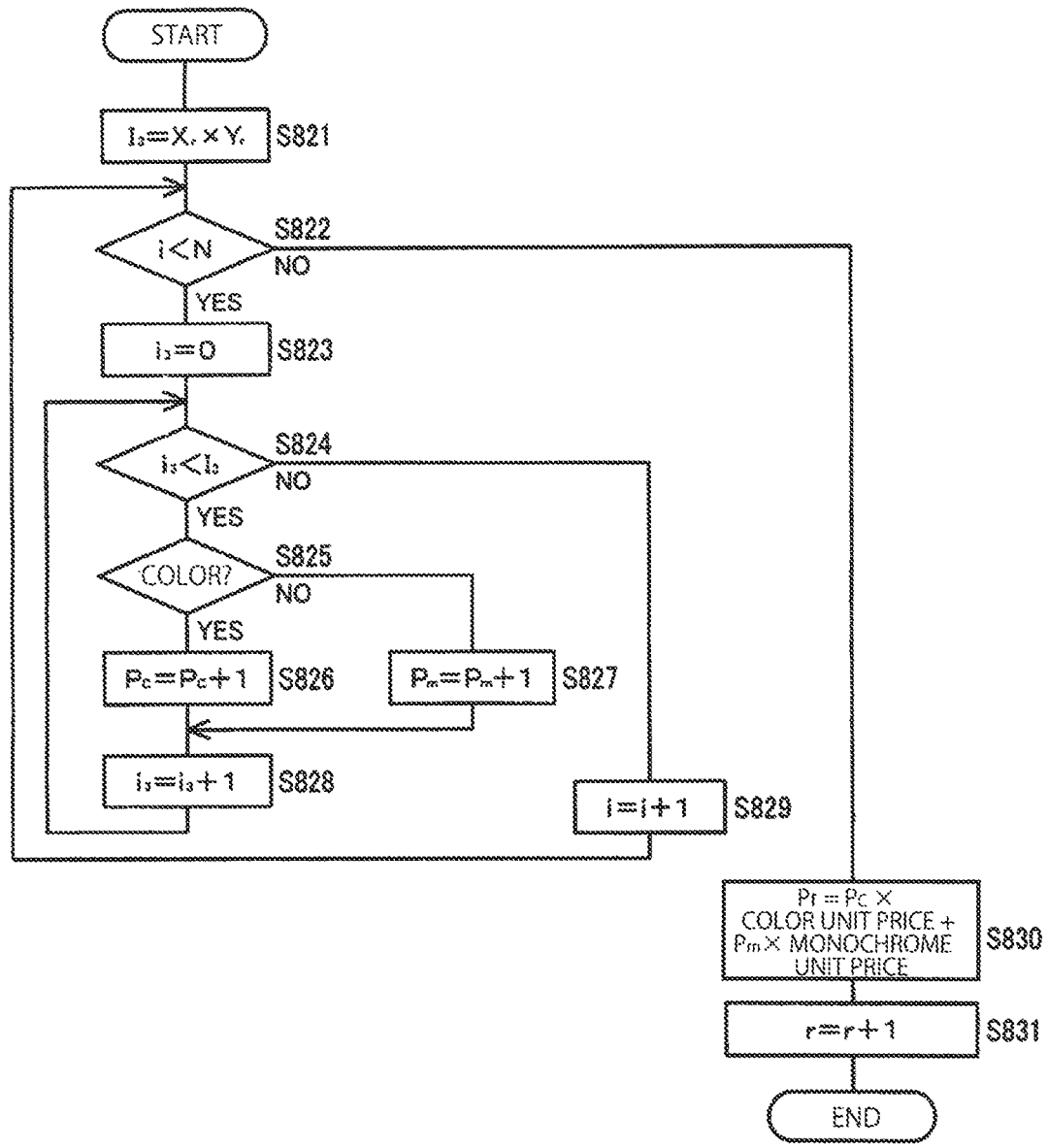

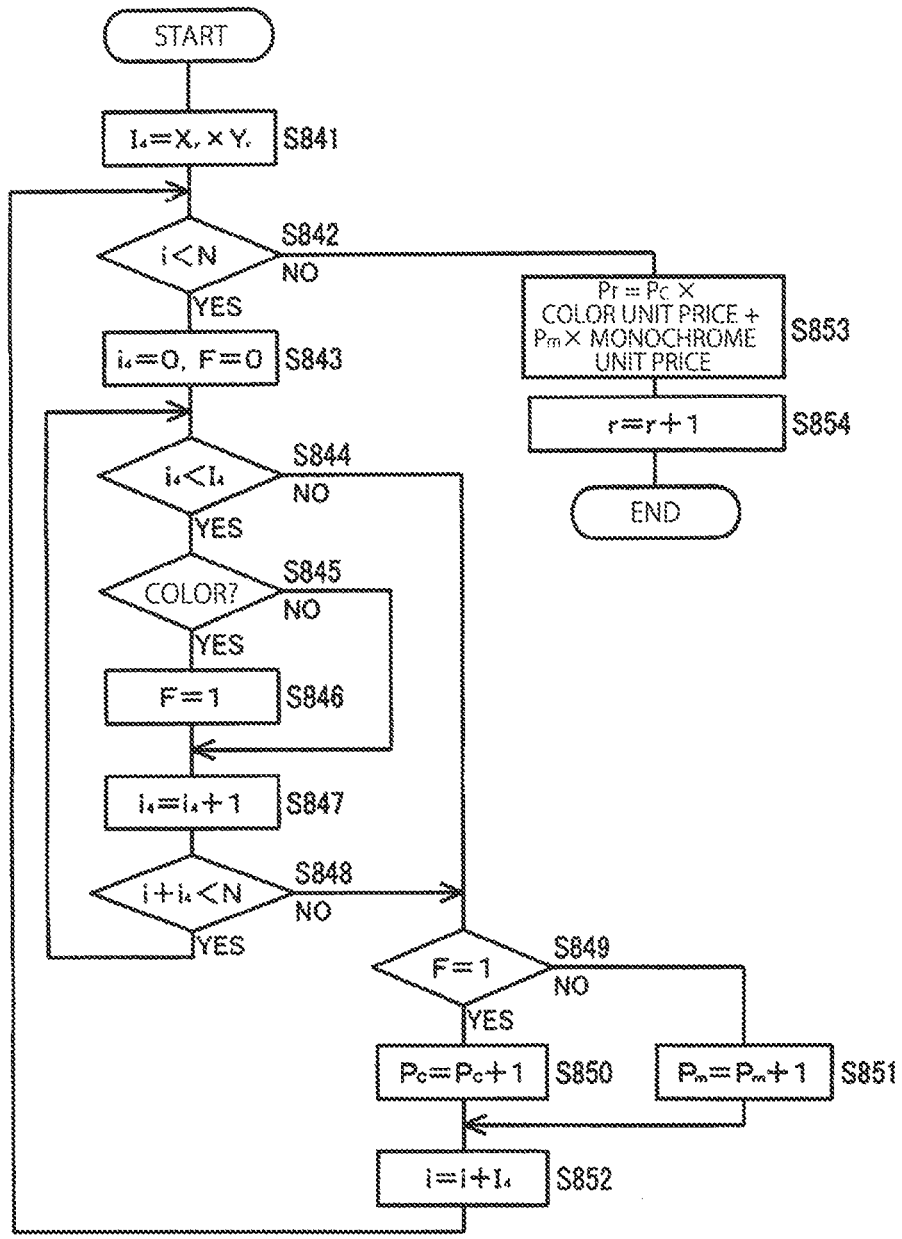

Fig.19

| ID | ENLARGEMENT/REDUCTION MODE |
|---|---|
| 1 | ENLARGEMENT/REDUCTION PRINT MODE OF ENLARGED/REDUCED PRINTING IN PAPER SIZE DESIGNATED IN ADVANCE |
| 2 | ENLARGEMENT/REDUCTION PRINT MODE OF ENLARGED/REDUCED PRINTING IN LARGER PAPER SIZE THAN PAPER SIZE DESIGNATED IN ADVANCE |
| 3 | ENLARGEMENT PRINT MODE OF ENLARGED PRINTING OF ONE PAGE DATA ON MULTIPLE PRINT MEDIA USING POSTER PRINT FUNCTION |
| 4 | REDUCTION PRINT MODE OF PRINTING MULTIPLE PAGES DATA COLLECTIVELY ON ONE PRINT MEDIUM USING N-up PRINT FUNCTION |

Fig.20

| ID | ITEM | DESCRIPTION |
|----|------|-------------|
| 1 | ENLARGEMENT/ REDUCTION MODE ID | ID INDICATING ENLARGEMENT/REDUCTION MODE |
| 2 | PRINT PAPER SIZE | SIZE OF MEDIUM FOR PRINTING ENLARGED/REDUCED PAGE DATA |
| 3 | NUMBER OF PRINT PAGES | NUMBER OF MEDIA TO BE PRINTED. NOTE THAT NUMBER OF PRINT PAGES INCREASES WITH USE OF POSTER FUNCTION AND NUMBER OF PRINT PAGES DECREASES WITH USE OF N-up PRINT FUNCTION. |
| 4 | X | NUMBER OF PAGES INTO WHICH ONE PAGE DATA IS TO BE SPLIT IN LATERAL DIRECTION WITH USE OF POSTER PRINT FUNCTION (ID:3); AND NUMBER OF PAGES TO BE ARRANGED IN LATERAL DIRECTION WITH USE OF N-up PRINT FUNCTION (ID:4). IN OTHER CASES, THIS VALUE IS IGNORED. |
| 5 | Y | NUMBER OF PAGES INTO WHICH ONE PAGE DATA IS SPLIT IN LONGITUDINAL DIRECTION WITH USE OF POSTER PRINT FUNCTION (ID:3), AND NUMBER OF PAGES TO BE ARRANGED IN LONGITUDINAL DIRECTION WITH USE OF N-up PRINT FUNCTION (ID:4). IN OTHER CASES, THIS VALUE IS IGNORED. |
| 6 | PAPER ORIENTATION | THIS INDICATES WHICH OF PORTRAIT ORIENTATION AND LANDSCAPE ORIENTATION OF PRINT MEDIUM IS USED TO ARRANGE PAGE DATA. PAPER ORIENTATION IS INDICATED BY PORTRAIT OR LANDSCAPE |
| 7 | NUMBER OF COLOR PAGES | NUMBER OF COLOR PAGES IN TOTAL NUMBER OF PAGES (NO. 3) WITH POSTER PRINT/N-up TAKEN INTO CONSIDERATION |
| 8 | NUMBER OF MONOCHROME PAGES | NUMBER OF MONOCHROME PAGES IN TOTAL NUMBER OF PAGES (NO. 3) WITH POSTER PRINT/N-up TAKEN INTO CONSIDERATION |
| 9 | FEE | FEE FOR ENLARGEMENT/REDUCTION MODE ADDED TO LIST |
| 10 | MINIMUM-FEE FLAG | FLAG INDICATING MOST INEXPENSIVE ENLARGEMENT/REDUCTION MODE IN LIST. FLAG FOR MOST INEXPENSIVE ITEM IS 1 AND FLAGS FOR OTHERS ARE 0. |

Fig.21

| No. | ENLARGEMENT/ REDUCTION MODE ID | PRINT PAPER SIZE | NUMBER OF PRINT PAGES | X | Y | PRINT ORIENTATION | NUMBER OF COLOR PAGES | NUMBER OF MONOCHROME PAGES | FEE (YEN) | MINIMUM FEE FLAG |
|---|---|---|---|---|---|---|---|---|---|---|
| 1 | 1 | A3 | 1 | 1 | 1 | PORTRAIT | 1 | 0 | 30 | 0 |
| 2 | 2 | A3+ | 1 | 1 | 1 | PORTRAIT | 1 | 0 | 40 | 0 |
| 3 | 3 | A4 | 2 | 1 | 2 | LANDSCAPE | 1 | 1 | 25 | 1 |
| 4 | 3 | A5 | 4 | 2 | 2 | PORTRAIT | 1 | 3 | 28 | 0 |

Fig.22

| No. | ENLARGE- MENT/ REDUCTION MODE ID | PRINT PAPER SIZE | NUMBER OF PRINT PAGES | X | Y | PRINT ORIENTA- TION | NUMBER OF COLOR PAGES | NUMBER OF MONOCH- ROME PAGES | FEE (YEN) | MINIMUM- FEE FLAG |
|---|---|---|---|---|---|---|---|---|---|---|
| 1 | 1 | A5 | 4 | 1 | 1 | PORTRAIT | 4 | 0 | 40 | 0 |
| 2 | 2 | B5 | 4 | 1 | 1 | PORTRAIT | 4 | 0 | 48 | 0 |
| 3 | 4 | A4 | 2 | 2 | 1 | LANDSCAPE | 2 | 0 | 30 | 1 |
| 4 | 4 | A3 | 1 | 2 | 2 | PORTRAIT | 1 | 0 | 30 | 1 |

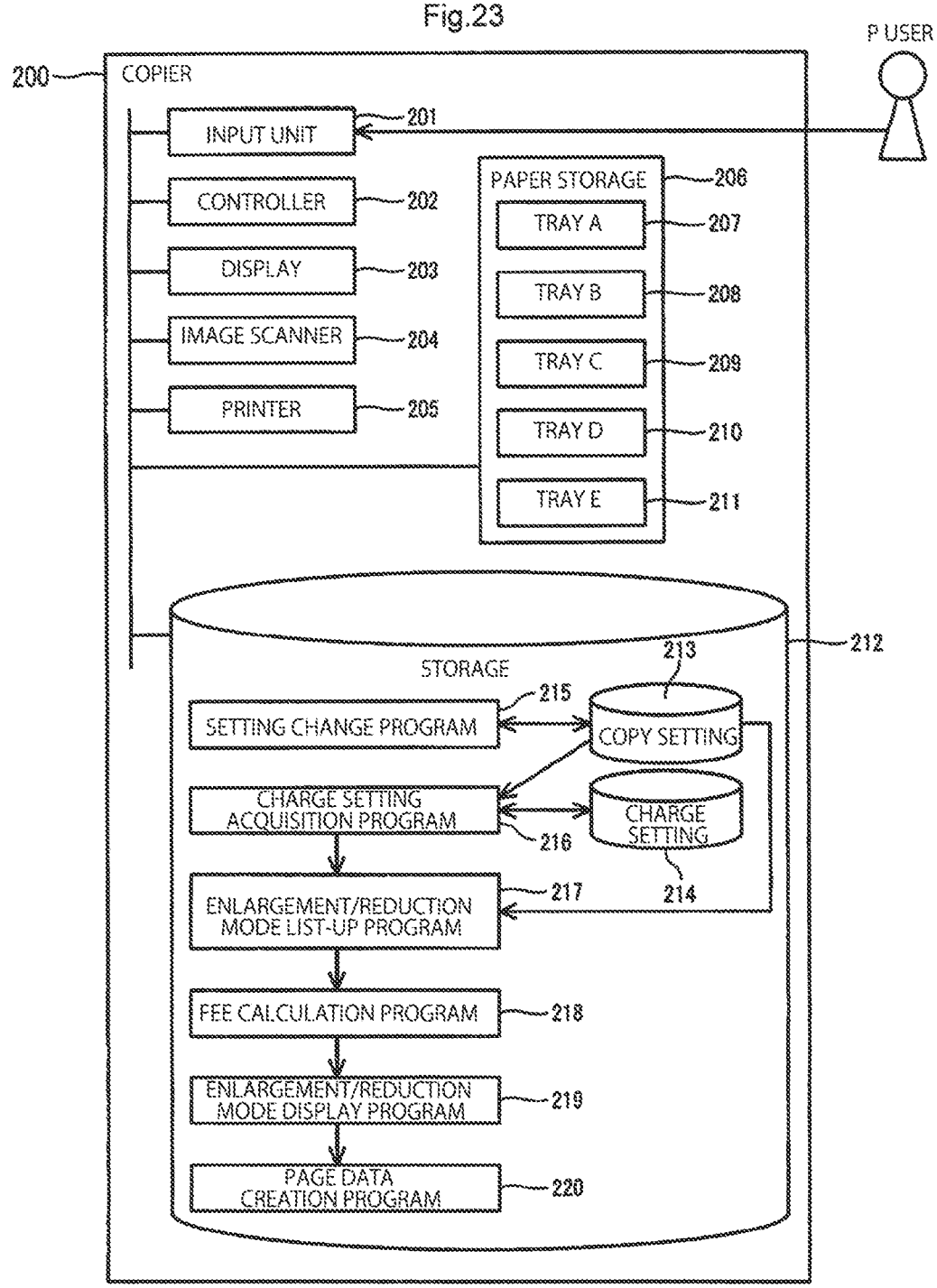

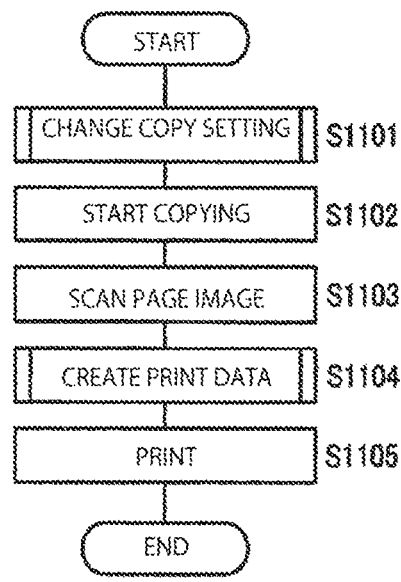

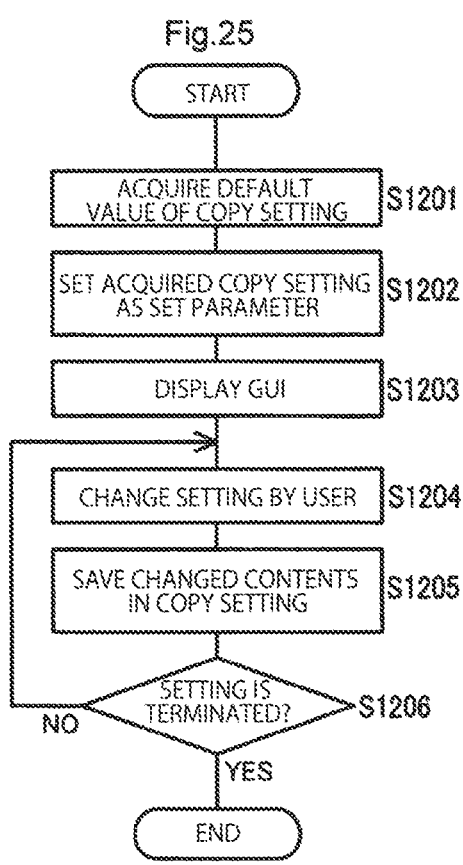

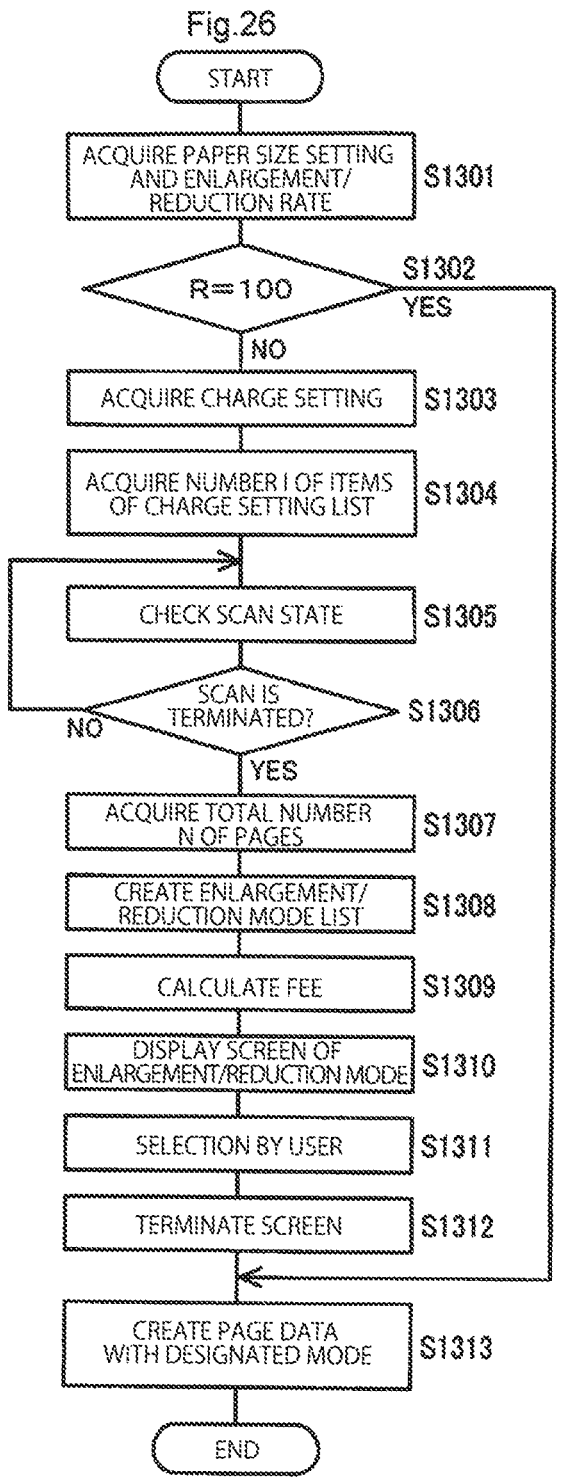

IMAGE PROCESSING METHOD AND IMAGE PROCESSING SYSTEM

CROSS REFERENCE TO RELATED APPLICATIONS

This application claims priority based on 35 USC 119 from prior Japanese Patent Application No. 2012-205327 filed on Sep. 19, 2012, entitled "IMAGE PROCESSING METHOD, IMAGE PROCESSING SYSTEM, AND IMAGE PROCESSING PROGRAM", the entire contents of which are incorporated herein by reference.

BACKGROUND OF THE INVENTION

1. Field of the Invention

The invention relates to an image processing method, an image processing system, and an image processing program that charge a fee for printing.

Some conventional image processing methods are designed to calculate a fee for printing by using a unit price of printing medium that takes into account the number of printed printing media, the toner used, a designated printing density, and a designated reduction rate (see, for example, Patent Document 1: Japanese Patent Application Publication No. 2002-32199)

SUMMARY OF THE INVENTION

However, in the conventional technique, there is not an apparatus configured to extract output settings for a printout and to allow users to select one of the settings. Accordingly, the users' convenience is low.

An object of an embodiment of the invention is to improve the users' convenience.

A first aspect of the invention is an image processing system that includes: an image processor configured to create print data; and an image formation unit configured to print the print data. The image processor includes: an enlargement/reduction rate designation unit configured to prompt a user to designate an enlargement/reduction rate to be used to create the print data; an information acquisition unit configured to acquire size information and unit price information of a printing medium stored in the image formation unit; an output mode extraction unit configured to extract output modes based on the designated enlargement/reduction rate and the size information of the printing medium acquired by the information acquisition unit; a fee calculation unit configured to, for each of the output modes extracted by the output mode extraction unit, calculate the number of printing media to be used from the size information of the printing medium acquired by the information acquisition unit, and calculate a fee from the calculated number of printing media and the unit price information acquired by the information acquisition unit; an output mode display unit configured to cause a display to display the output modes and the fees calculated corresponding to the respective output modes by the fee calculation unit, and thereby prompt the user to select one of the output modes; and a print data creation unit configured to create the print data based on the selected output mode.

A second aspect of the invention is an image processing method in an image processor to create print data and an image formation unit to charge for printing the print data. The image processor includes: an enlargement/reduction rate designation step of prompting a user to designate an enlargement/reduction rate to be used to create the print data; an information acquisition step of acquiring size information and unit price information of a printing medium stored in the image formation unit; an output mode extraction step of extracting output modes based on an enlargement/reduction rate designated at the enlargement/reduction rate designation step and the size information of the printing medium acquired at the information acquisition step; a fee calculation step of, for each of the output modes extracted by the output mode extraction unit, calculating the number printing media to be used from the size information of the printing medium acquired at the information acquisition step, and calculating a fee from the calculated number of printing media and the unit price information acquired at the information acquisition step; an output mode display step of displaying the output modes and the fees calculated corresponding to the respective output mode at the fee calculation step, and thereby prompting the user to select one of the output modes; and a print data creation step of creating the print data based on the output mode selected at the output mode display step.

A third aspect of the invention is an information processor that includes: a first input unit configured to accept designation of an enlargement/reduction rate; an extraction unit configured to extract a first output setting for printout at the designated enlargement/reduction rate and a second output setting different from the first output setting for printout at the designated enlargement/reduction rate; a calculation unit configured to calculate a first fee for the first output setting and a second fee for the second output setting; a display configured to display the first output setting and the first fee in association with each other, and the second output setting and the second fee in association with each other; a second input unit configured to accept any one of selections of the first output setting and the second output setting; and a controller configured to cause the execution of image formation onto a medium with the output setting selected through the second input unit.

These aspects of the invention can improve the user convenience.

BRIEF DESCRIPTION OF THE DRAWINGS

FIG. 7 is an illustration of a charge setting list in the first embodiment;

FIG. 11 is a flowchart illustrating a flow of an enlargement/reduction mode list creation processing in the first embodiment;

FIG. 12 is a flowchart illustrating a flow of an enlargement/reduction mode list creation processing in the first embodiment;

FIG. 13 is a flowchart illustrating a flow of an enlargement/reduction mode creation processing in the first embodiment;

FIG. 14 is a flowchart illustrating a flow of an enlargement/reduction mode creation processing in the first embodiment;

FIG. 15 is a flowchart illustrating a flow of fee calculation processing in the first embodiment;

FIG. 16 is a flowchart illustrating a flow of fee calculation processing in the first embodiment;

FIG. 17 is a flowchart illustrating a flow of fee calculation processing in the first embodiment;

FIG. 18 is a flowchart illustrating a flow of fee calculation processing in the first embodiment;

FIG. 19 is an illustration of enlargement/reduction mode IDs in the first embodiment;

FIG. 20 is a table of items in an enlargement/reduction mode list in the first embodiment;

FIG. 21 is an illustration of an example of an enlargement/reduction mode list in the first embodiment;

FIG. 22 is an illustration of another example of an enlargement/reduction mode list in the first embodiment;

FIG. 23 is a block diagram illustrating the configuration of an image formation apparatus in a second embodiment;

FIG. 24 is a flowchart illustrating a flow of printing processing in the second embodiment;

FIG. 25 is a flowchart illustrating a flow of a copy setting change processing in the second embodiment; and FIG. 26 is a flowchart illustrating a flow of a print data creation processing in the second embodiment.

DETAILED DESCRIPTION OF EMBODIMENTS

Figure 1:
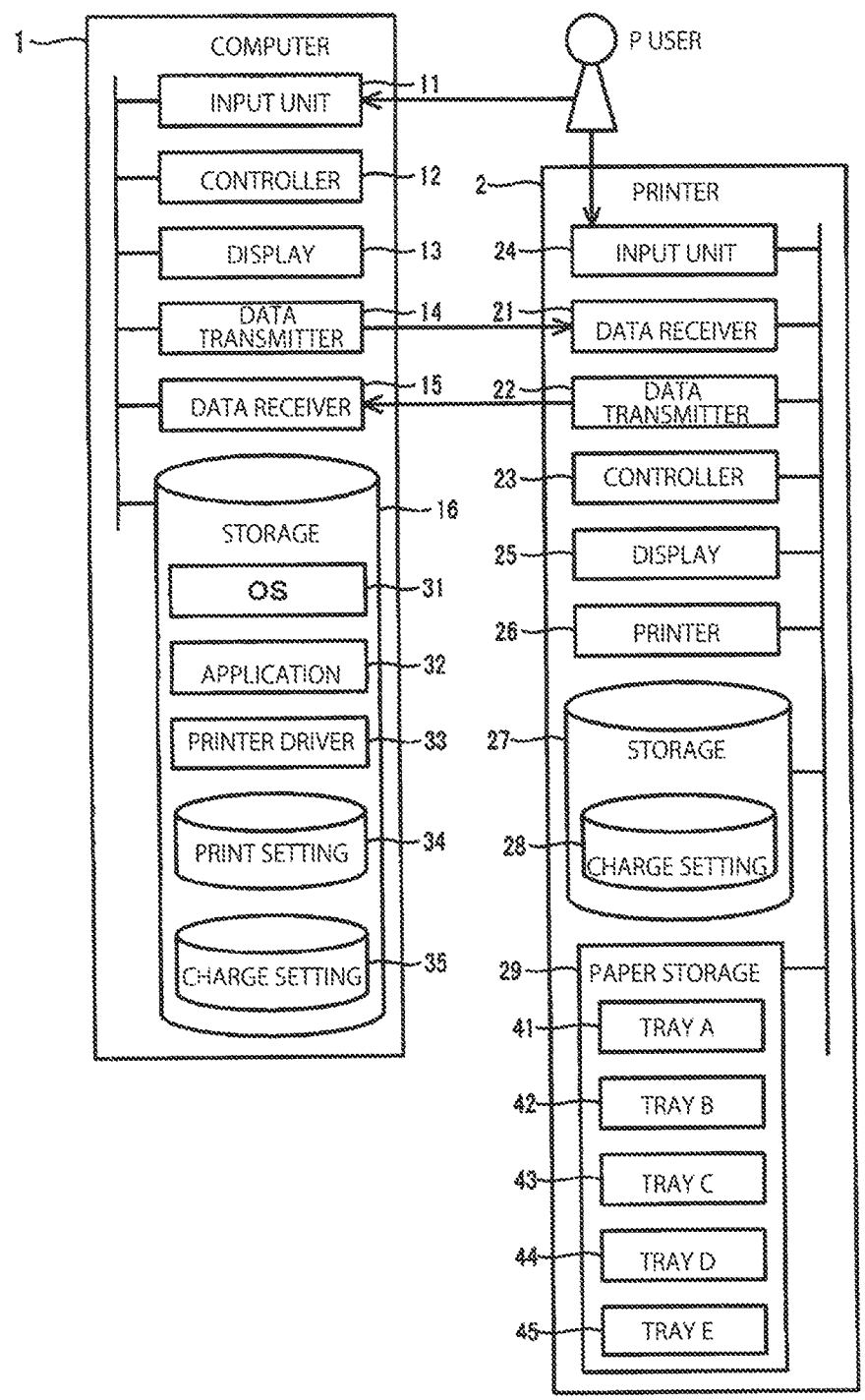
FIG. 1 is a block diagram illustrating the configuration of an image processing system in a first embodiment.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

Hereinafter, referring to the drawings, embodiments of an image processing method, an image processing system, and an image processing program are described.

First Embodiment

FIG. 1 is a block diagram illustrating the configuration of an image processing system in a first embodiment. In FIG. 1, the image processing system includes computer 1 as an image processing apparatus (an image processor) configured to create print data, and printer 2 as an image formation apparatus (an image formation unit) configured to charge for printing the print data. Computer 1 and printer 2 are connected via a communication line so as to be communicated with each other. Computer 1 includes input unit 11, controller 12, display 13, data transmitter 14, data receiver 15, and storage 16.

Controller 12 includes, for example, a CPU (Central Processing Unit) and the like, and controls input unit 11, display 13, data transmitter 14, and data receiver 15 based on various kinds of programs (software) stored in storage 16 to control an entire operation of computer 1. Input unit 11 includes, for example, a keyboard and a mouse, and receives an input operation from user P. Display 13 includes, for example, an LCD (Liquid Crystal Display) and is caused by control of controller 12 to display text or images on the screen.

The data transmitter 14 is controlled by the controller 12 to send printer 2 data received from the storage 16. Data receiver 15 receives the data transmitted from printer 2. The storage 16 is configured of, for example, a memory such as a RAM (Random Access Memory) and an HD (Hard Disc) and includes OS (Operating System Software) 31, application (software) 32, printer driver (software) 33, print setting 34, and charge setting 35.

OS 31 is software which is executed by controller 12 to provide input/output functions such as data input from input unit 11 or screen output to display 13 and basic functions to be commonly used by application 32, such as management of storage 16, and manages entire computer 1. Application 32 is software which is managed by OS 31. Also, OS 31 and application 32 include a function to instruct printer driver 33 to print data inputted by user P via input unit 11 with an input of a print command by pressing down a "print" button or the like which is displayed on display 13 with an operation of input unit 11 by user P.

Printer driver 33 is a program to convert document data created in application 32 into data in a format capable of being interpreted by printer 2, and is a program to provide user P with a GUI (Graphical User Interface) as a screen for setting the functions of printer 2 or printer driver 33 before printing. Print setting 34 as print setting information is for storing, for example, an enlargement/reduction rate, which is an enlargement rate or a reduction rate, a document paper size and a printing paper size as setting values.

Charge setting 35 as charge setting information is a copy of charge setting 28 stored in storage 27 of printer 2 to be described later and has the same configuration as that of charge setting 28. Printer 2 includes data receiver 21, data transmitter 22, controller 23, input unit 24, display 25, printer 26, storage 27, and paper storage 29. Controller 23 is configured of, for example, a CPU to control an entire operation of printer 2 by controlling data receiver 21, data transmitter 22, input unit 24, display 25, printer 26, and paper storage 29 based on various programs and data which are stored in storage 27.

Storage 27 is configured of a RAM or HD which stores print setting information, print data, charge setting 28, or the like, and a ROM (Read Only Memory) which stores firmware, character font data, or the like as various programs for controlling printer 2. Input unit 24 includes an operation button disposed on an operation panel, for example, to receive an input operation made by user P. Display 25 includes, for example, an LCD and is caused by control of controller 23 to display text or images on the screen.

The data transmitter 22 is controlled by the controller 23 to transmit data to computer 1. The data receiver 21 receives the data transmitted from the computer 1. Printer 26 is a print mechanism to print data onto printing paper. Paper storage 29 includes, for example, tray A41, tray B92, tray C93, tray D44, and tray E45, so to be capable of respectively storing different sizes or kinds of printing media in the trays and supplying printer 26 with the printing media.

As illustrated in FIG. 7, charge setting 28 as a charge setting list is configured of paper sizes which are stored in the trays A41 to E45 of paper storage 29 as paper storage trays, color unit prices as color print unit price information for color printing on each paper size, and monochrome unit price as monochrome print price information for monochrome printing on each paper size. Note that charge setting 35 of computer 1 is a copy of charge setting 28.

Figure 2:
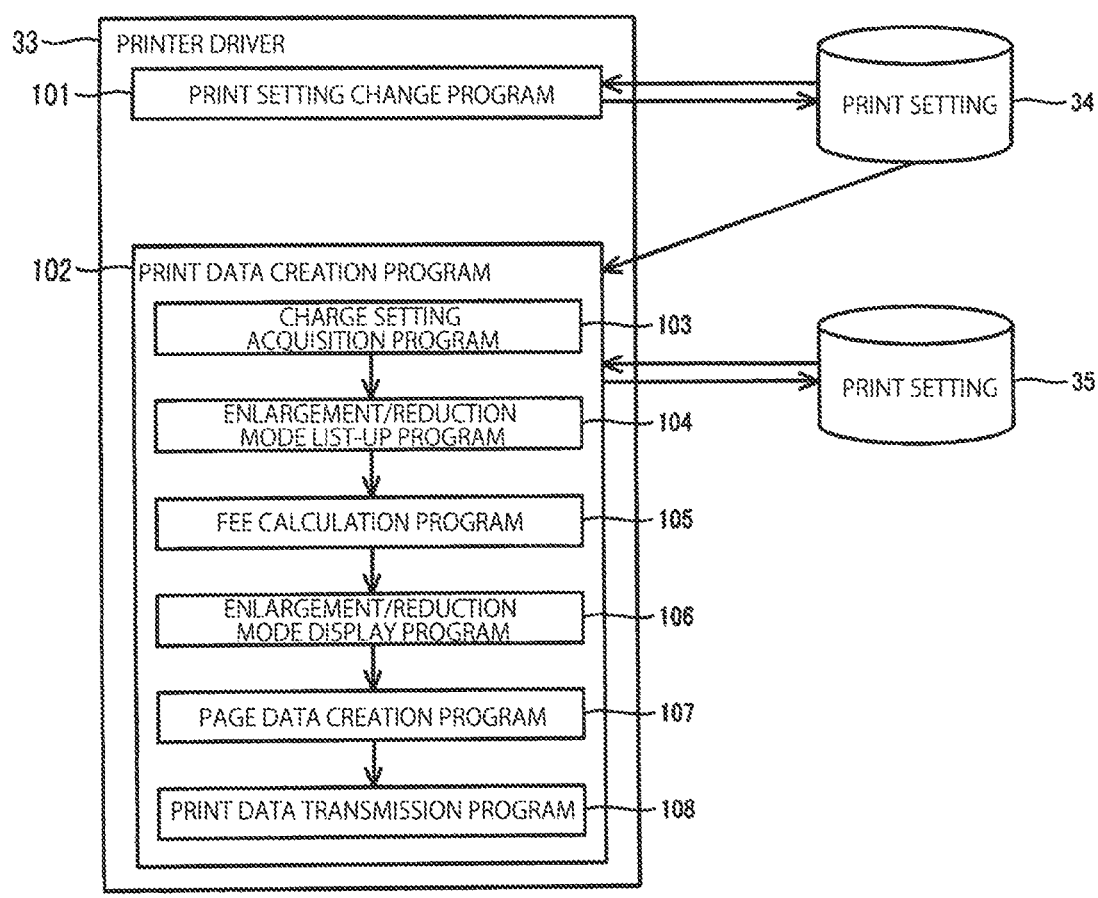
FIG. 2 is a block diagram illustrating the configuration of a printer driver in the first embodiment.

Hereinafter, the configuration of printer driver 33 which is stored in storage 16 of computer 1 is described by referring to FIG. 1 based on the block diagram illustrating the configuration of printer driver in the first embodiment. In FIG. 2, printer driver 33 has print setting change program 101 and print data creation program 102.

Print setting change program 101 as an enlargement/reduction rate designation unit is an enlargement/reduction rate designation program to designate an enlargement/reduction rate, a document paper size, and a printing paper size to be used to create print data. Print setting change program 101 includes a function to provide user P with a GUI for setting before printing the functions of printer 2 and printer driver 33 among the functions of printer driver 33. Print setting change program 101 acquires settings from print setting 34 to be reflected on the GUI when GUI is displayed and saves the settings on the GUI in print setting 34 when the GUI is ended.

Print data creation program 102 includes a function to convert document data created in application 32 into print data in a data format capable of being interpreted in printer 2 among the functions of printer driver 33. The print data created in this print data creation program 102 is created based on the print setting information stored in print setting 34. Print data creation program 102 has charge setting acquisition program 103, enlargement/reduction mode list-up program 104, fee calculation program 105, enlargement/reduction mode display program 106, page data creation program 107, and print data transmission program 108.

Charge setting acquisition program 103 as an information acquisition unit is an information acquisition program to acquire size information and unit price information of the printing media to be stored in printer 2, and acquires charge setting 28 from printer 2. Enlargement/reduction mode list-up program 104 as an output mode extraction unit is an output mode extraction program to extract output modes based on the enlargement/reduction rate designated in print setting change program 101, and the size information of the printing media acquired in charge setting acquisition program 103. The enlargement/reduction mode list-up program 104 lists up the enlargement/reduction modes from the enlargement/reduction rate stored in print setting 34, the paper size, and charge setting 35.

Fee calculation program 105 as a fee calculation unit is a fee calculation program to calculate a fee for each output mode extracted in the enlargement/reduction mode list-up program 104 in such a manner that the number of printing media to be used is calculated from the size information of the printing media acquired in the charge setting acquisition program 103. Then a fee is calculated from the number of printing media and unit price information acquired in charge setting acquisition program 103. Then the calculation program 105 calculates a fee based on charge setting 35 for the enlargement/reduction mode listed up by enlargement/reduction mode list-up program 104. Also, fee calculation program 105 calculates a fee by determining whether or not the printing data is color or monochrome.

Enlargement/reduction mode display program 106 as an output mode display unit displays each fee calculated in fee calculation program 105 together with the output mode to accept a selection of the output mode. Enlargement/reduction mode display program 106 then displays on display 13 each enlargement/reduction mode listed up by enlargement/reduction mode list-up program 104, and the fee of each enlargement/reduction mode calculated in fee calculation program 105 to allow user P to select the enlargement/reduction mode through input unit 11.

Page data creation program 107 as a print data creation unit is a print data creation program to create print data based on the output mode selected by enlargement/reduction mode display program 106, and creates page data from the document data in a data format capable of being interpreted in printer 2 based on print setting 34 and the enlargement/reduction mode selected by enlargement/reduction mode display program 106. Print data transmission program 108 is a program to transmit page data created in page data creation program 107 to printer 2 via data transmitter 14.

Figure 8:
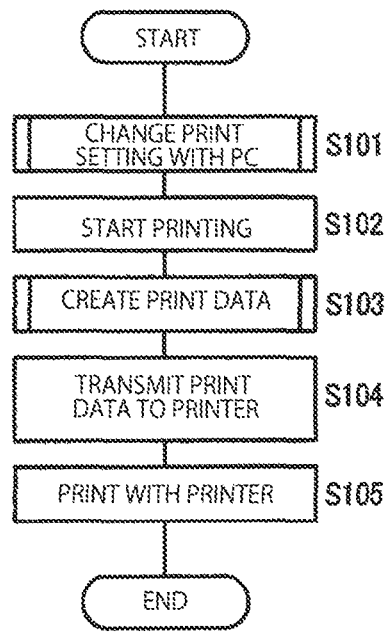
FIG. 8 is a flowchart illustrating a flow of printing processing in the first embodiment.

Effects of the above-described configuration are described. Firstly, printing processing to be performed by the image processing system is briefly described by referring to FIGS. 1 and 2 according to steps expressed by S in the drawings of the flowchart illustrating the flow of the printing processing in the first embodiment in FIG. 8.

S101: print setting change program 101 in printer driver 33 of computer 1 performs print setting change processing to change print setting 34 in storage 16 based on the print setting information inputted in input unit 11 through the operation of user P. Print setting 34 is referred to when the document data created by application 32 operating on OS 31 is converted to print data.

S102: Application 32 accepts the operation of user P for instructing the printing with input unit 11 and starts the printing.

S103: Print data creation program 102 in printer driver 33 performs print data creation processing to create the print data.

S104: Data transmitter 14 in computer 1 transmits the created print data to printer 2 and data receiver 21 of printer 2 receives the print data.

S105: Print unit 26 of printer 2 prints the print data received by data receiver 21. At this time, print unit 26 performs a printing after feeding the designated printing medium from paper storage 29 and charges based on charge setting 28 stored in storage 27. Then the present processing is terminated.

Figure 9:
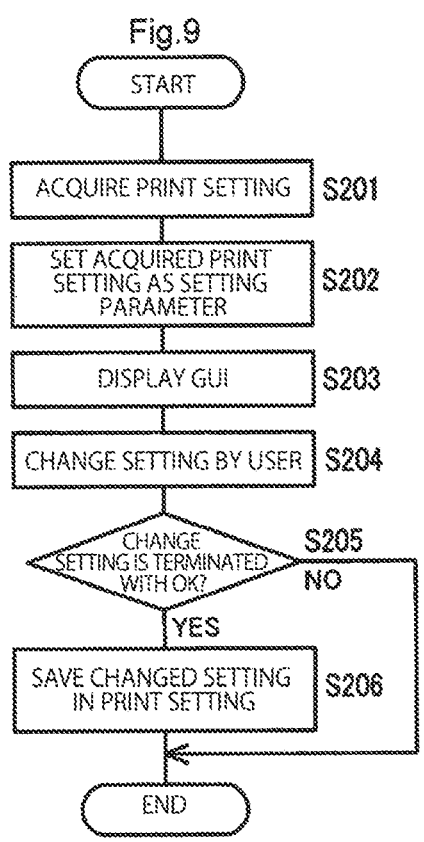
FIG. 9 is a flowchart illustrating a flow of a print setting change processing in the first embodiment.

Next, print setting change processing to be performed by the print setting change program of the printer driver of the computer is described by referring to FIGS. 1 and 2 according to steps expressed by S in the drawings of the flowchart illustrating the flow of the print setting change processing in the first embodiment in FIG. 9. Note that this print setting change processing is processing to be performed at S101 of FIG. 8.

S201: Print setting change program 101 acquires print setting 34 including a document paper size, a printing paper size, and an enlargement/reduction rate from storage 16.

S202: Print setting change program 101 sets the acquired print setting as setting parameters for each item. For example, print setting change program 101 sets "A4" as a setting parameter of the document paper size, and also sets "A4" as a setting parameter of the printing paper size, and sets "100%" as the setting parameter of the enlargement/reduction rate.

S203: Print setting change program 101 displays GUI in which the setting parameter set at S202 is reflected on display 13.

Figure 3:
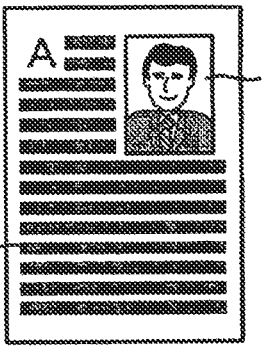
FIG. 3 is an illustration of enlarged print data in the first embodiment.

S204: Print setting change program 101 accepts the operation of changing the settings of the items, which is made by user P through input unit 11, and changes the settings of the items. For example, when the print data illustrated in FIG. 3 is printed, the document size is "A9" and thus the setting parameter of the document paper size is kept as "A4." Then, since the enlargement/reduction rate is 141%, print setting change program 101 changes the setting parameter of the printing paper size from "A4" to "A3," and the enlargement/reduction rate from "100%" to "141%." S205: Print setting change program 101 displays the termination of the print setting on the GUI, and determines whether or not an "OK" button is pressed down on the GUI. When it is determined that the button is pressed, the processing proceeds to S206. When it is determined that a "Cancel" button other than the "OK" button is pressed down, the processing terminates without saving the changed setting in print setting 34.

S206: Print setting change program 101 terminates the present processing after saving the changed setting in print setting 34.

Figure 10:
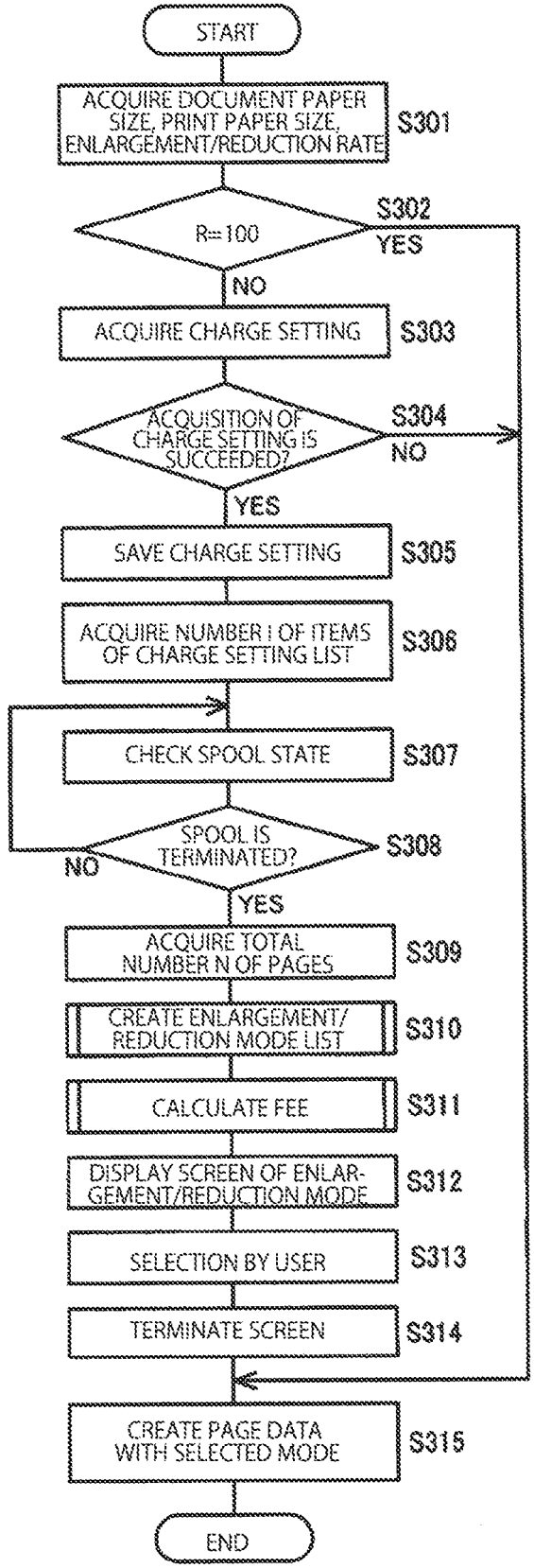
FIG. 10 is a flowchart illustrating a flow of a print data creation processing in the first embodiment.

Next, print data creation processing to be performed by the print data creation program of the printer driver of the computer is described by referring to FIGS. 1 and 2 according to steps expressed by S in the drawings of the flowchart illustrating the flow of the print data creation processing in the first embodiment in FIG. 10. Note that this print setting change processing is performed at S103 of FIG. 8.

S301: Print data creation program 102 acquires paper size names, widths, and heights of the document paper size and printing paper size, and enlargement/reduction rates R(%) from print setting 34.

S302: Print data creation program 102 determines whether or not the acquired enlargement/reduction rate R is 100%. When it is determined that the rate is 100%, enlargement/reduction is not performed, and thus the processing proceeds to S315 to create page data having the designated setting. When it is determined that the rate is not 100%, the processing proceeds to S303.

S303: When print data creation program 102 determines that the acquired enlargement/reduction rate R is not 100%, charge setting acquisition program 103 acquires charge setting 28 from printer 2.

At this time, charge setting acquisition program 103 creates command data as a command to acquire the charge setting and transmits the created data from data transmitter 14 to the data receiver 21 of the printer 2. Controller 23 of printer 2 executes the command received by data receiver 21 and transmits charge setting 28 stored in storage 27 from data transmitter 22 to data receiver 15 of computer 1.

S304: Charge setting acquisition program 103 proceeds the processing to S305 when it is determined that charge setting 28 has been successfully acquired. On the other hand, when charge setting 28 does not exist in printer 2, controller 23 of printer 2 cannot correctly execute the command due to the absence of a transmission target. Thus, charge setting acquisition program 103 determines that the acquisition of charge setting 28 has failed. Thus, the processing proceeds to S315 to create page data having the designated setting because information required for the subsequent processing does not exist.

S305: Charge setting acquisition program 103, having successfully acquired charge setting 28, saves charge setting 28 transmitted to data receiver 15 in the storage 16, as charge setting 35.

S306: Charge setting acquisition program 103 acquires I which is the number of items of charge setting 35. As illustrated in FIG. 7, charge setting 35 is configured of paper sizes which are stored in the trays A41 to E45 of paper storage 29 as paper storage trays, a color unit price as a color print unit price when color printing is made on each paper size, and a monochrome print unit price when monochrome printing is made on each paper size. Thus, the number I of the items can be acquired from the configuration. In the example illustrated in FIG. 7, the number I of the items is 5.

S5307: Charge setting acquisition program 103 checks a spool state of the print data. Here, the print data is spooled on a spooler in, for example, an EMF format (Enhanced Metafile Format) before the page data creation processing is performed in print data creation program 102 of printer driver 33. In general, the spooled print data is subsequently subjected to the page data creation processing by print data creation program 102 of printer driver 33. However, it is assumed here that the print data is not delivered to page data creation program 107 before the enlargement/reduction mode setting screen is terminated.

S308: Charge setting acquisition program 103 proceeds the processing to S307 until the spool state of the print data is changed from the spooling state to the end of the spooling. When the spool state is ended, the processing proceeds to S309.

S309: Charge setting acquisition program 103 detects the end of the spooling and acquires the total number N of pages of the print data from the spooled print data.

S310: Next, enlargement/reduction mode list-up program 104 creates an enlargement/reduction mode list. Note that the process of creating the enlargement/reduction mode list is described later.

S311: Next, fee calculation program 105 calculates a fee for each item of the created enlargement/reduction mode list. Note that the processing of calculating the fee for each item of the enlargement/reduction mode list is described later.

S312: Next, enlargement/reduction mode display program 106 displays an enlargement/reduction mode setting screen.

Figure 4:
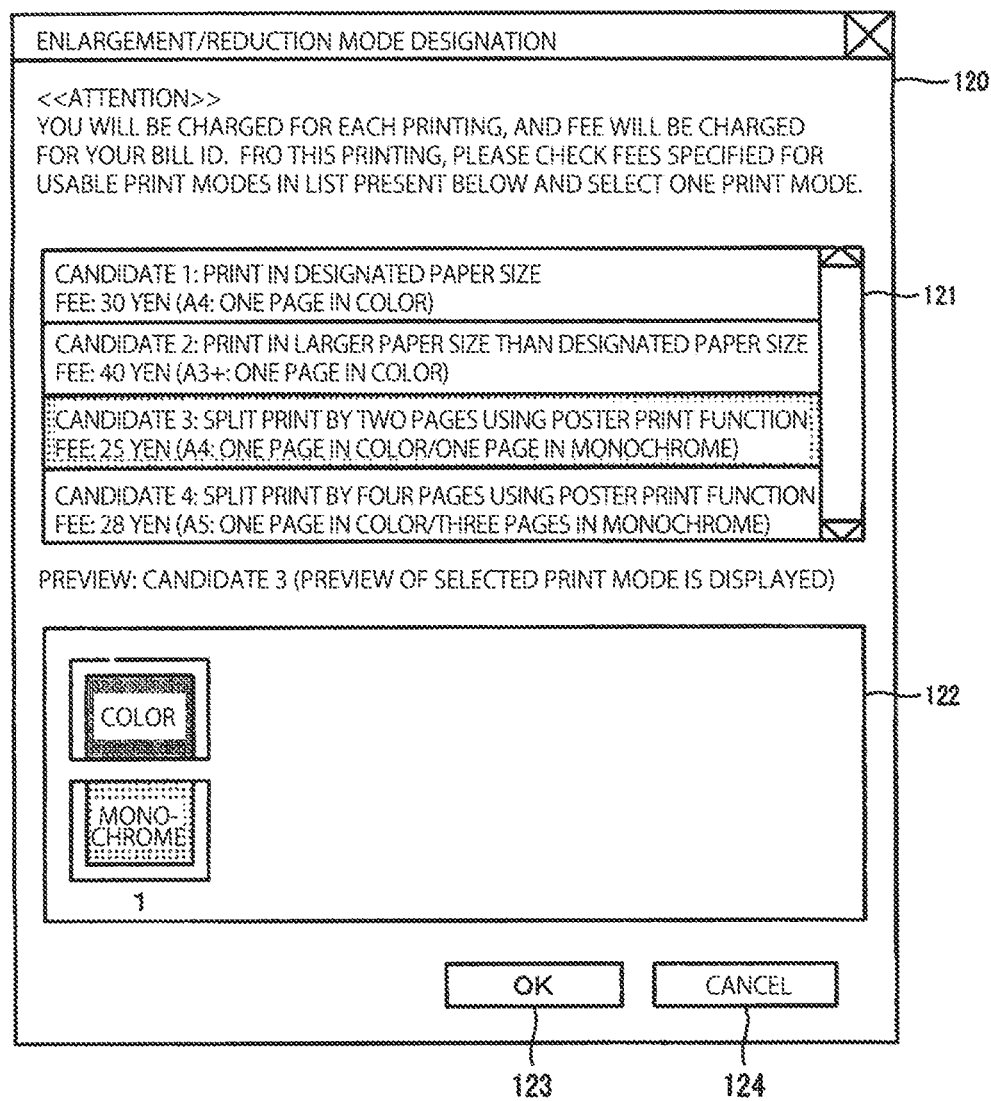
FIG. 4 is an illustration of an enlargement mode setting screen in the first embodiment.

Here, the enlargement/reduction mode setting screen for printing one page of A4 enlarged by 141% on A3 paper, like the print data illustrated in FIG. 3, is enlargement/reduction mode setting screen 120 illustrated in FIG. 4. This enlargement/reduction mode setting screen 120 displays list 121 of four print mode candidates in the center and displays preview 122 with the selected print mode thereunder. Also, enlargement/reduction mode setting screen 120 displays OK button 123 to instruct printing by adopting the enlargement/reduction mode selected by user P, and cancel button 124 to instruct printing with a previously-designated setting without adopting the enlargement/reduction mode selected by user P.

The list of the candidates includes a print mode of enlargement/reduction printing in a paper size designated in advance, a print mode of enlargement/reduction printing in a paper size larger than the designated paper size, a print mode using a poster print function to perform enlargement printing by splitting an enlarged image by multiple sheets, and a print mode using an N-up print function to print multiple reduced pages on one sheet collectively. Those modes are listed up at S310.

Figure 5:
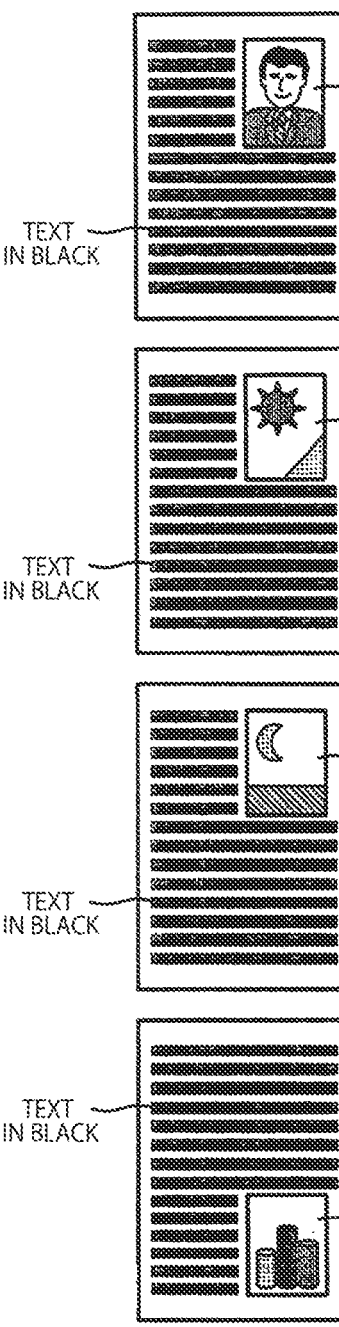
FIG. 5 is an illustration of reduced print data in the first embodiment.
Figure 6:
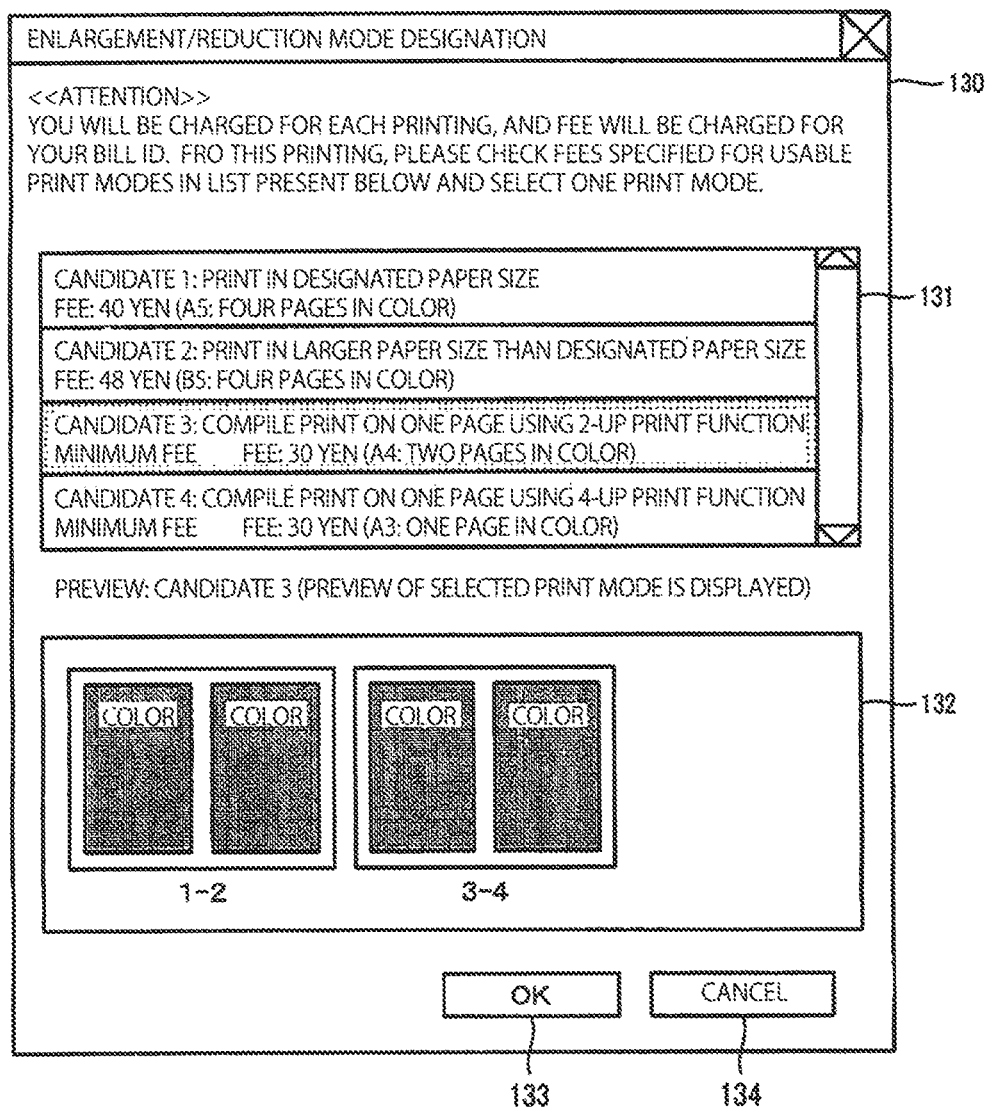
FIG. 6 is an illustration of a reduction mode setting screen in the first embodiment.

The print data illustrated in FIG. 3 includes a color image in the upper half portion of the paper and a monochrome image in the lower half portion of the paper without a color image. Thus, when the print data is printed by splitting it by two A4 pages using the poster print function, the number of printing pages of the color page is one and the number of printing pages of the monochrome page is one. Thus, the fee becomes 25 yen In Japanese currency of this example) which is the minimum value. Also, when four pages of A4 document are reduced by 70% to be printed on A5 paper like the print data illustrated in FIG. 5, enlargement/reduction mode setting screen 130 illustrated in FIG. 6 is displayed. This enlargement/reduction mode setting screen 130 displays a list 131 of four print mode candidates in the center and displays preview 132 with the selected print mode thereunder.

Also, enlargement/reduction mode setting screen 130 displays OK button 133 to instruct printing by adopting the enlargement/reduction mode selected by user P and cancel button 134 to instruct printing with a previously-designated setting without adopting the enlargement/reduction mode selected by user P. When the print data illustrated in FIG. 5 is collectively printed on two sheets of A4 paper using the N-up print function, the number of color pages to be printed is two and the fee of 30 yen is the lowest.

S313: Enlargement/reduction display program 106 accepts an operation of selecting a desired enlargement/reduction mode by user P on the enlargement/reduction mode setting screen.

S314: Enlargement/reduction mode display program 106 accepts an operation of terminating the enlargement/reduction mode setting screen by user P on the enlargement/reduction mode setting screen. When OK button 123 illustrated in FIG. 4 is pressed down, the selected enlargement/reduction mode is adopted for the page data creation processing. When cancel button 124 is pressed down, the selected enlargement/reduction mode is not adopted for the page data creation processing but instead, the enlargement/reduction mode designated in advance is adopted for the page data creation processing. At that time, enlargement/reduction mode display program 106 starts supplying the print data spooled in the spooler with page data creation program 107.

S315: Page data creation program 107 adopts the selected or designated enlargement/reduction mode to create page data. Then, the processing is terminated.

Hereinafter, the enlargement/reduction mode list creation processing which is performed by the enlargement/reduction mode list-up program is described by referring to FIGS. 11 to 14. Note that this enlargement/reduction mode list creation processing is performed at S310 of FIG. 10.

Firstly, enlargement/reduction mode list creation processing is briefly described by referring to FIGS. 1 and 2 according to steps expressed by S in the drawings of the flowchart illustrating the flow of the enlargement/reduction mode list creation processing in the first embodiment in FIG. 11.

S401: Enlargement/reduction mode list-up program 104 initializes the list number T which is a variable expressing the number of lists with "0."

S402: Enlargement/reduction mode list-up program 104 adds the print mode in the designated paper size into the enlargement/reduction mode list.

Here, the enlargement/reduction mode list is a group of items having 10 items as illustrated in FIG. 20 in one item of the list.

The 10 items include: enlargement/reduction mode ID which is identification information for identifying an enlargement/reduction mode; a printing paper size indicating a size of the medium onto which enlarged/reduced page data is to be printed; the number of media to be printed, which is determined by considering the result of the poster print or the N-up print; X which indicates the number of pages split in the lateral direction when the poster print function is used and indicates the number of pages arranged in the lateral direction when the N-up print function is used; Y which indicates the number of pages split in the longitudinal direction when the poster print function is used and indicates the number of pages arranged in the lateral direction when the N-up print function is used; a printing direction which indicates which of the portrait orientation and the landscape orientation of the printing medium is used to arrange the page data; the number of color pages which indicates the number of pages to be printed in color among the total number of pages determined by considering the result of the poster print or the N-up print; the number of monochrome pages which indicates the number of pages to be printed in monochrome among the total number of pages determined by considering the result of the poster print or the N-up print; a fee indicating a fee to be charged for printing by this enlargement/reduction mode; and a minimum-fee flag which is a flag indicating the least expensive enlargement/reduction mode in the enlargement/reduction mode list, for example.

The enlargement/reduction mode as an output mode is an output mode of outputting on a printing medium with a designated size, an output mode of outputting on a printing medium with a size larger than a designated printing medium size, and an output mode of outputting an enlarged image on multiple printing media or an output mode of outputting multiple pages on one printing medium. These modes are identified by enlargement/reduction mode IDs. The enlargement/reduction mode IDs are expressed by numeral values of 1 to 4, for example, as illustrated in FIG. 19. ID1 is an ID indicating the enlargement/reduction print mode on paper with a size designated in advance. ID2 is an ID indicating the enlargement/reduction print mode on paper having a size designated in advance. ID3 is an ID indicating the enlargement/reduction print mode of printing data of one page on multiple printing media using the poster print function. ID4 is an ID indicating the mode of printing the printing data of multiple pages collectively onto one printing medium using the N-up print function.

As for the items to be added at S402, when the print data is the print data illustrated in FIG. 3, as illustrated in No. 1 in FIG. 2, "1" is set for the enlargement/reduction mode ID, "A3" for the printing paper size, "1" for the number of printing pages, "1" for X, "1" for Y, and "longitudinal" for print direction. Since the number of color pages, the number of monochrome pages, the fee and the minimum-fee flag are set at S311, "0" is temporarily set for each of these items. Also, as for the items to be added at S402, when the print data is the print data illustrated in FIG. 5, as illustrated No. 1 in FIG. 2, "1" is set for the enlargement/reduction mode ID, "A5" for the printing paper size, "4" for the number of printing pages, "1" for X, "1" for Y, and "longitudinal" for print direction, and similarly "0" is temporarily set for each of the number of color pages, the number of monochrome pages, the fee and the minimum-fee flag.

S403: Next, enlargement/reduction mode list-up program 104 adds "1" into the listed number.

S404: Enlargement/reduction mode list-up program 104 performs a processing to add the print mode on paper having a size larger than the designated paper size. The processing is described later.

S405: Enlargement/reduction mode list-up program 104 determines whether enlargement printing is performed or reduction printing is performed depending on whether the enlargement/reduction rate R is larger or smaller than 100%. When it is determined that it is an enlargement printing whose enlargement/reduction rate R is larger than 100%, the processing proceeds to S406. When it is determined that it is a reduction printing whose enlargement/reduction rate R is smaller than 100%, the processing proceeds to S407.

S406: When it is determined that it is the enlargement printing whose enlargement/reduction rate R is larger than 100%, enlargement/reduction mode list-up program 104 performs processing to add the enlargement print mode into the enlargement/reduction mode list using the poster print function. The process of adding the enlargement print mode into the enlargement/reduction mode list by using the poster print function is described later.

S407: When it is determined that it is the reduction printing whose enlargement/reduction rate R is smaller than 100%, enlargement/reduction mode list-up program 104 performs processing of adding the reduction print mode into the enlargement/reduction mode list using the N-up print function. The processing of adding the reduction print mode into the enlargement/reduction mode list by using the N-up print function is described later.

Next, the process of adding the print mode on paper having a size larger than the designated paper size, which is performed by the enlargement/reduction list-up program, into the enlargement/reduction mode list is described by referring to FIGS. 1 and 2 according to steps expressed by S in the figures in the flow illustrating the enlargement/reduction mode list creation processing in the first embodiment in FIG. 12. The processing of adding the print mode on paper having a size larger than the designated paper size into the enlargement/reduction mode list is processing which is performed at S404 in FIG. 11. The processing is the process of adding the print mode on the least expensive paper into the enlargement/reduction mode list among the sheets of paper having sizes larger than the designated paper size by using charge setting 35. Charge setting 35 is a charge setting list as illustrated in FIG. 7, and enlargement/reduction mode list-up program 104 performs the processing sequentially with reference to the information of charge setting 35.

S501: Enlargement/reduction mode list-up program 104 initializes variable C expressing the list No. of charge setting 35 with "0."

S502: Enlargement/reduction mode list-up program 104 initializes a loop counter i with "0."

S503: Enlargement/reduction mode list-up program 104 initializes a color charging unit price U with "0." Here, the color charging unit price U is used for determining the relative levels of the charging unit price among the printing media. In the embodiment, the high and low relationship among printing media are common to the monochrome charging unit price and the color charging unit price, and the charging unit price is determined as high or low using the color charging unit price as a representative.

S504: Enlargement/reduction mode list-up program 104 determines whether or not the loop counter i has a value smaller than the total number I of items of the list of charge setting 35. When it is determined that the loop counter i has a value smaller than the total number I of items of the list of charge setting 35, the processing proceeds to S505. When it is determined that the loop counter i has a value equal to or larger than the total number I of items of the list of charge setting 35, the processing proceeds to S512. It is adopted here that when all the items of the list of charge setting 35 are checked, the value of the loop counter i becomes equal to the value of the total number I of items, and the processing proceeds to S512 out of the loop. It is adopted that the value of the loop counter i being smaller than the total number of items means that all the items of the list of charge setting 35 are not checked and the following items are to be checked.

S505: Enlargement/reduction mode list-up program 104 compares a height Ho of the designated printing paper size with a height Hi of a paper size stored as an item of the i-th list. When the height Hi is larger than the height Ho, the processing proceeds to S506. When the height Hi is equal to or smaller than the height Ho, it is determined that the designated printing paper size is smaller than the page size stored in the list and the consideration of a charging unit price is excluded. Then, the processing proceeds to S511.

S506: Enlargement/reduction mode list-up program 104, having determined that the height Hi is higher than the height Ho, compares a width Wo of the designated printing paper size with a width Wi of a paper size stored as an item of the i-th list. When the width Wi is larger than the width Wo, the processing proceeds to S507. When the width Wi is equal to or smaller than the width Wo, it is determined that the designated printing paper size is smaller than the page size stored in the list and the consideration of a charging unit price is excluded. Then, the processing proceeds to S511.

S507: Enlargement/reduction mode list-up program 104, having determined that the width Wi is larger than the width Wo, determines whether or not a color charging unit price U is "0." When it is determined that the color charging unit price U is "0," this means that the page size stored in the list is the paper size having an original large size, and the processing proceeds to S509 while skipping a comparison on color charging unit price in S508. When it is determined that the color charging unit price U is not "0," this means that a large paper size is used as a print target paper size at least once, and the processing proceeds to S508.

S508: Enlargement/reduction mode list-up program 104, having determined that the color charging unit price U is not "0," compares the color charging unit price U with a color unit price of the list of charge setting 35. When it is determined that the color unit price Ui is equal to or smaller than the color charging unit price U, this means that the paper size is larger than the designated paper size and the color unit price Ui of charge setting 35 is already equal to or smaller than the color charging unit price. Then, the processing proceeds to S509. On the other hand, when it is determined that the color unit price Ui is larger than the color charging unit price U, this means that the paper size is larger than the designated paper size but the color charging unit price U which has been selected is cheaper than the color unit price Ui. Then, the processing proceeds to S511.

S509: Enlargement/reduction mode list-up program 104, having determined that the color unit price Ui is equal to or smaller than the color charging unit price U, substitutes the i-th color unit price Ui of charge setting 35 for the color charging unit price U.

S510: Enlargement/reduction mode list-up program 104 substitutes the loop counter i for variable C indicating the list No. of charge setting 35. Accordingly, the list No. of charge setting 35 which is a selection target is stored as candidate information.

S511: Enlargement/reduction mode list-up program 104 adds "1" to the loop counter i, which is then updated, in order to process the next items of charge setting 35. Then, the processing proceeds to S504.

S512: Enlargement/reduction mode list-up program 109, having determined that the loop counter i has a value equal to or larger than the total number I of items of the list of charge setting 35 at S504, determines whether or not the color charging unit price U is "0." When it is determined that the color charging unit price U is "0," this means that the charge setting 35 does not has a paper size larger than the designated paper size. Thus, the processing is terminated without being added into the enlargement/reduction mode list. When it is determined that the color charging unit price U is not "0," this means that the charge setting 35 had a paper size larger than the designated paper size. Thus, the processing proceeds to S513.

S513: Enlargement/reduction list-up program 104 adds the list No. of charge setting 35, which is a selection target, into the enlargement/reduction mode list by utilizing the stored candidate information.

At this time, enlargement/reduction mode list-up program 104 can see the list No. of charge setting 35 with the value stored in variable C indicating the list No. of charge setting 35.

For example, when the print data (printing paper size A3) illustrated in FIG. 3 is printed, if the selection is made from the charge setting list illustrated in FIG. 7, "2" is stored in variable C, and a candidate to be printed on the paper size A3+ of No. 3 by referring the index starting from 0 is added into the enlargement/reduction mode list. At this time, enlargement/reduction mode list-up program 104 sets "2" for enlargement/reduction mode ID of the enlargement/reduction mode list, "A3+" for the printing paper size, "1" for the number of printing pages, "1" for X, "1" for Y, and "longitudinal" for a paper orientation, and temporarily sets and adds a provisional value of "0" for the number of color pages, the number of monochrome pages, the fee, and the minimum-fee flag.

S514: Enlargement/reduction mode list-up program 104 adds "1" into the number T of the lists. Then, the processing is terminated.

Next, the process of adding the enlargement print mode using the poster print function, which is performed by the enlargement/reduction list-up program, into the enlargement/reduction mode list is described by referring to FIGS. 1 and 2 according to steps expressed by S in the figures in the flow of the enlargement/reduction mode list creation processing in the first embodiment in FIG. 13. The process of adding the enlargement print mode using the poster print function into the enlargement/reduction mode list is performed at S406 in FIG. 11.

The processing is processing of adding the enlargement print mode using the poster print function to print multiple pages on paper having a size smaller than the designated paper size into the enlargement/reduction mode list by using charge setting 35. Charge setting 35 is a charge setting list as illustrated in FIG. 7, and enlargement/reduction mode list-up program 104 performs the processing sequentially referring to the information of charge setting 35.

S601: Enlargement/reduction mode list-up program 104 initializes a loop counter i with "0."

S602: Enlargement/reduction mode list-up program 104 determines whether or not the loop counter i has a value smaller than the total number I of the items of the list of charge setting 35. When it is determined that the loop counter i has a value smaller than the total number I of items of the list of charge setting 35, it determines that all the items are not checked, and the processing proceeds to S603. When it is determined that the loop counter i has a value equal to or larger than the total number I of items of the list of charge setting 35, it determines that all the items have been checked, and thus the processing is terminated.

S603: Enlargement/reduction mode list-up program 104 calculates how many pages Xp of printing paper having a printing paper size of the i-th list of charge setting 35 are required to exceed a width of a printing paper size designated in advance when the pages Xp are arranged in the lateral direction with their longitudinal directions set in the portrait orientation. Here, the number of pages Xp arranged in the lateral direction can be obtained by dividing a width Wo of the printing paper size designated in advance by a width Wi of the printing paper size of the i-th list of charge setting 35. Note that the number of paper sheets Xp is an integer which is obtained by rounding up after the decimal point.

S609: Enlargement/reduction mode list-up program 104 calculates how many pages Yp of printing paper having the printing paper size of the i-th list of charge setting 35 are required to exceed a height of the printing paper size designated in advance when the pages Yp are arranged in the longitudinal direction with their longitudinal directions set in the portrait orientation. Here, the number of pages Yp arranged in the longitudinal direction can be obtained by dividing a height Ho of the printing paper size designated in advance by a height Hi of the printing paper size of the i-th list of charge setting 35. Note that the number of paper sheets Yp is an integer which is obtained by rounding up after the decimal point.

S605: Enlargement/reduction mode list-up program 104 calculates how many pages Xq of printing paper having the printing paper size of the i-th list of charge setting 35 are required to exceed the width of the printing paper size designated in advance when the pages Xq are arranged in the lateral direction with their longitudinal directions set in the landscape orientation. Here, the number of pages Xq arranged in the lateral direction can be obtained by dividing the width Wo of the printing paper size designated in advance by the height Hi of the printing paper size of the i-th list of charge setting 35. Note that the number of pages Xq is an integer which is obtained by rounding up after the decimal point.

S606: Enlargement/reduction mode list-up program 104 calculates how many pages Yq of printing paper having the printing paper size of the i-th list of charge setting 35 are required to exceed the width of the printing paper size designated in advance when the pages Xq are arranged in the longitudinal direction with their longitudinal directions set in the landscape orientation. Here, the number of pages Yq arranged in the longitudinal direction can be obtained by dividing the height Ho of the printing paper size designated in advance by the width Wi of the printing paper size of the i-th list of charge setting 35. Note that the number of paper sheets Yq is an integer which is obtained by rounding up after the decimal point.

S607: Enlargement/reduction mode list-up program 104 determines whether or not a product of the number of pages Xp calculated at S603 and the number of pages Yp calculated at S604 is larger than 1 in order to determine whether or not the printing paper size where the pages having the printing paper size of the i-th lit of charge setting 35 are arranged in the lateral and longitudinal directions with their longitudinal directions set in the portrait orientation is large enough to cover the printing paper size designated in advance. When it is determined that the product of the number of pages Xp and the number of pages Yp is larger than 1, enlargement/reduction mode list-up program 104 determines that the printing paper size designated in advance is not covered, and proceeds the processing to S608. When it is determined that the product of the number of pages Xp and the number of pages Yp is equal to or smaller than 1, enlargement/reduction mode list-up program 104 determines that the printing paper size designated in advance is covered, and proceeds the processing to S613 because it does not have to be split and printed on multiple pages by using the poster print function and there is no need to be added into the enlargement/reduction mode list.

S608: When it is determined that the product of the number of pages Xp and the number of pages Yp is larger than 1, enlargement/reduction mode list-up program 104 determines whether or not a product of the number of pages Xq calculated at S605 and the number of pages Yq calculated at S606 is larger than 1 in order to determine whether or not the printing paper size where the pages having the printing paper size of the i-th list of charge setting 35 are arranged in the lateral and longitudinal directions with their longitudinal directions set in the landscape orientation is large enough to cover the printing paper size designated in advance. When it is determined that the product of the number of pages Xq and the number of pages Yq is larger than 1, enlargement/reduction mode list-up program 104 determines that the printing paper size designated in advance is not covered, and proceeds the processing to S609. When it is determined that the product of the number of pages Xq and the number of pages Yq is equal to or smaller than 1, enlargement/reduction mode list-up program 104 determines that the printing paper size designated in advance is covered, and proceeds the processing to S613 because it does not have to be split and printed on multiple pages by using the poster print function and there is no need to be added into the enlargement/reduction mode list.

S609: Enlargement/reduction mode list-up program 104, having determined that the product of the number of pages Xq and the number of pages Yq is larger than 1, compares the product of the number of pages Xp and the number of pages Yp with the product of the number of pages Xq and the number of pages Yq. This is for determining which of the portrait orientation and the landscape orientation the longitudinal direction of the printing page having the printing paper size of the i-th list of charge setting 35 should be set in to achieve more effective printing. Since a smaller product requires a smaller number of pages to be used, this is determined as effective.

When it is determined that the product of the number of pages Xp and the number of pages Yp is equal to or smaller than the product of the number of pages Xq and the number of pages Yq, enlargement/reduction mode list-up program 104 proceeds the proceeding to S610. When it is determined that the product of the number of pages Xp and the number of pages Yp is equal to or larger than the product of the number of pages Xq and the number of pages Yq, it proceeds the processing to S611.

S610: When it is determined that the product of the number of pages Xp and the number of pages Yp is equal to or smaller than the product of the number of pages Xq and the number of pages Yq, enlargement/reduction mode list-up program 104 adds a pattern in which the printing paper having the printing paper size of the i-th list of charge setting 35 is used with the longitudinal direction set in the portrait orientation into the enlargement/reduction mode list and proceeds to the processing at S612. At this time, enlargement/reduction mode list-up program 104 sets and adds "3" as enlargement/reduction mode ID of the enlargement/reduction mode list, "the printing paper size of the i-th list of charge setting 35" as the printing paper size, "a value obtained by multiplying a product of the number N of pages of the original document and the number of pages Xp by the number of pages Yp" as the number of printing pages, "the number of pages Xp" as X, "the number of pages Yp" as Y, and "portrait" as a paper orientation, and temporarily sets a provisional value of "0" for the number of color pages, the number of monochrome pages, the fee, and the minimum-fee flag.

S611: When it is determined that the product of the number of pages Xp and the number of pages Yp is larger than the product of the number of pages Xq and the number of pages Yq, enlargement/reduction mode list-up program 104 adds a pattern in which the printing paper having the printing paper size of the i-th list of charge setting 35 is used with the longitudinal direction set in the landscape orientation into the enlargement/reduction mode list and proceeds the processing to S612. At this time, enlargement/reduction mode list-up program 104 sets and adds "3" as enlargement/reduction mode ID of the enlargement/reduction mode list, "the printing paper size of the i-th list of charge setting 35" as the printing paper size, "a value obtained by multiplying a product of the number N of pages of the original document and the number of pages Xq by the number of pages Yq" as the number of printing pages, "the number of pages Xq" as X, "the number of pages Yq" as Y, and "landscape" as a paper orientation, and temporarily sets a provisional value of "0" for the number of color pages, the number of monochrome pages, the fee, and the minimum-fee flag.

S612: Next, enlargement/reduction mode list-up program 104 adds "1" to the number T of the lists.

S613: Enlargement/reduction mode list-up program 104 adds "1" to the loop counter i, which is then updated, in order to process the next items of charge setting 35. Then, the processing proceeds to S602.

Next, the processing of adding the reduction print mode using the N-up print function, which is performed by the enlargement/reduction list-up program, into the enlargement/reduction mode list is described by referring to FIGS. 1 and 2 according to steps expressed by S in the figures in the flow of the enlargement/reduction mode list creation processing in the first embodiment in FIG. 14. The process of adding the reduction print mode using the N-up print function into the enlargement/reduction mode list is processing performed at S407 in FIG. 11. The processing is processing of adding the reduction print mode using the N-up print function to print multiple pages on paper having a size larger than the designated size into the enlargement/reduction mode list by using charge setting 35. Charge setting 35 is a charge setting list as illustrated in FIG. 7, and enlargement/reduction mode list-up program 104 performs processing sequentially referring to the information of charge setting 35.

S701: Enlargement/reduction mode list-up program 104 initializes a loop counter i with "0."

S702: Enlargement/reduction mode list-up program 104 determines whether or not the loop counter i has a value smaller than the total number I of items of the list of charge setting 35. When it is determined that the loop counter i has a value smaller than the total number I of items of the list of charge setting 35, it determines that all the items are not checked, and the processing proceeds to S703. When it is determined that the loop counter i has a value equal to or larger than the total number I of items of the list of charge setting 35, it determines that all the items have been checked, and thus the processing is terminated.

S703: Enlargement/reduction mode list-up program 104 calculates how many pages Xp of the printing paper having the printing paper size designated in advance can be arranged in the lateral direction in the printing paper having a printing paper size of the i-th list of charge setting 35, whose longitudinal direction is set in the landscape orientation, within a range without exceeding the width in the lateral direction. Here, the number of pages Xp arranged in the lateral direction can be obtained by dividing a width Wi of the printing paper size of the i-th list of charge setting 35 by a width Wo of the printing paper size designated in advance. Note that the number of paper sheets Xp is an integer which is obtained by rounding up after the decimal point.

S704: Enlargement/reduction mode list-up program 104 calculates how many pages Yp of the printing paper having the printing paper size designated in advance can be arranged in the longitudinal direction in the printing paper size of the i-th list of charge setting 35 is used in portrait orientation, whose longitudinal direction is set in the portrait orientation, within a range not exceeding the height in the longitudinal direction. Here, the number of pages Yp arranged in the longitudinal direction can be obtained by dividing a height Hi of the printing paper size of the i-th list of charge setting 35 by a height Ho of the printing paper size designated in advance. Note that the number of paper sheets Yp is an integer which is obtained by rounding up after the decimal point.

S705: Enlargement/reduction mode list-up program 104 calculates how many pages Xq of the printing paper having the printing paper size designated in advance can be arranged in the lateral direction in the printing paper having a printing paper size of the i-th list of charge setting 35, whose longitudinal direction is set in the landscape orientation, within a range not exceeding the width in the lateral direction. Here, the number of pages Xq arranged in the lateral direction can be obtained by dividing the height i of the printing paper size of the i-th list of charge setting 35 by the width Wo of the printing paper size designated in advance. Note that the number of pages Xq is an integer which is obtained by rounding up after the decimal point.

S706: Enlargement/reduction mode list-up program 104 calculates how many pages Yq of the printing paper having the printing paper size designated in advance can be arranged in the longitudinal direction in the printing paper having a printing paper size of the i-th list of charge setting 35, whose longitudinal direction is set in the landscape orientation, within a range not exceeding the height in the longitudinal direction. Here, the number of pages Yq arranged in the lateral direction can be obtained by dividing the width Wi of the printing paper size of the i-th list of charge setting 35 by the height Ho of the printing paper size designated in advance. Note that the number of paper sheets Yq is an integer which is obtained by rounding up after the decimal point.

S707: Enlargement/reduction mode list-up program 104 determines whether or not a product of the number of pages Xp calculated at S703 and the number of pages Yp calculated at S704 is larger than 1 in order to determine whether or not the printing paper having the printing paper size of the i-th list of charge setting 35 with the longitudinal direction set in the portrait orientation has a size covering the printing paper size designated in advance. When it is determined that the product of the number of pages Xp and the number of pages Yp is larger than 1, enlargement/reduction mode list-up program 104 determines that the N-up print is possible, and proceeds the proceeding to S709. When it is determined that the product of the number of pages Xp and the number of pages Yp is equal to or smaller than 1, it determines that the N-up print is impossible, and proceeds the processing to S708.

S708: Enlargement/reduction mode list-up program 104, having determined that the N-up print is impossible in the printing page having the printing paper size of the i-th list of charge setting 35 with the longitudinal direction set in the portrait orientation, determines whether or not a product of the number of pages Xq calculated at S705 and the number of pages Yq calculated at S706 is larger than 1 in order to determine whether or not the printing paper having the printing paper size of the i-th list of charge setting 35 with the longitudinal direction set in the landscape orientation has a size covering the printing paper size designated in advance.

When it is determined that the product of the number of pages Xq and the number of pages Yq is larger than 1, enlargement/reduction mode list-up program 104 determines that the N-up print is possible and proceeds the processing to S709. When it is determined that the product of the number of pages Xq and the number of pages Yq is equal to or smaller than 1, enlargement/reduction mode list-up program 104 determines that the N-up print is impossible, and proceeds the processing to S713 because printing on the printing paper having the printing paper size of the i-th list of charge setting 35 using the N-up print function is impossible and there is no need to be added into the enlargement/reduction mode list.

S709: At S707 or S708, enlargement/reduction mode list-up program 104, having determined that the N-up print is possible, compares a product of the number of pages Xp and the number of pages Yp with the product of the number of pages Xq and the number of pages Yq.

This is for determining which of the portrait orientation and the landscape orientation the longitudinal direction of the printing page having the printing paper size of the i-th list of charge setting 35 should be set in order to achieve more effective printing. Since a larger product indicates that a larger number of pages can be printed collectively on one printing medium, this is determined as effective. When it is determined that the product of the number of pages Xp and the number of pages Yp is larger than the product of the number of pages Xq and the number of pages Yq, enlargement/reduction mode list-up program 104 proceeds the proceeding to S710. When it is determined that the product of the number of pages Xp and the number of pages Yp is equal to or smaller than the product of the number of pages Xq and the number of pages Yq, it proceeds the processing to S711.

S710: When it is determined that the product of the number of pages Xp and the number of pages Yp is equal to or smaller than the product of the number of pages Xq and the number of pages Yq, enlargement/reduction mode list-up program 104 adds a pattern in which the printing paper having the printing paper size of the i-th list of charge setting 35 is used with the longitudinal direction set in the portrait orientation into the enlargement/reduction mode list and proceeds the processing at S712. At this time, enlargement/reduction mode list-up program 104 sets and adds "4" as enlargement/reduction mode ID of the enlargement/reduction mode list, "the printing paper size of the i-th list of charge setting 35" as the printing paper size, "a value obtained by dividing a quotient of the number N of pages of the original document by the number of pages Xp by the number of pages Yp" as the number of printing pages, "the number of pages Xp" as X, "the number of pages Yp" as Y, and "portrait" as a paper orientation, and temporarily sets a provisional value of "0" for the number of color pages, the number of monochrome pages, the fee, and the minimum-fee flag.

S711: When it is determined that the product of the number of pages Xp and the number of pages Yp is larger than the product of the number of pages Xq and the number of pages Yq, enlargement/reduction mode list-up program 104 adds a pattern in which the printing paper having the printing paper size of the i-th list of charge setting 35 is used with the longitudinal direction set in the landscape orientation into the enlargement/reduction mode list and proceeds the processing to S712. At this time, enlargement/reduction mode list-up program 104 sets and adds "4" as enlargement/reduction mode ID of the enlargement/reduction mode list, "the printing paper size of the i-th list of charge setting 35" as the printing paper size, "a value obtained by dividing a quotient of the number N of pages of the original document by the number of pages Xq by the number of pages Yq" as the number of printing pages, "the number of pages Xq" as X, "the number of pages Yq" as Y, and "landscape" as a paper orientation, and temporarily sets a provisional value of "0" for the number of color pages, the number of monochrome pages, the fee, and the minimum-fee flag.

S712: Enlargement/reduction mode list-up program 104 adds "1" into the number of lists T.

S713: Enlargement/reduction mode list-up program 104 adds "1" to the loop counter i, which is then updated, in order to process the next items of charge setting 35. Then, the processing proceeds to S702.

Next, fee calculation processing to be performed by the fee calculation program is briefly described by referring to FIGS. 1 and 2 according to steps expressed by S in the drawings of the flowchart illustrating the flow of the fee calculation processing in the first embodiment in FIG. 15. Note that this fee calculation processing is processing to be performed at S311 of FIG. 10. The processing is processing to calculate a fee on each item of the enlargement/reduction mode list listed up by enlargement/reduction mode list-up program 104. Fee calculation program 105 performs processing sequentially referring to the information of the enlargement/reduction list.

S801: Fee calculation program 105 initializes a loop counter r with "0."

S802: Fee calculation program 105 determines that a fee is not calculated for all the items of the enlargement/reduction mode list when the loop counter r compares the number T of items of the enlargement/reduction mode list which are listed up by enlargement/reduction mode list-up program 104 with the loop counter r and when it is determined that a value of the loop counter r is smaller than the number T of items of the enlargement/reduction mode list. The processing then proceeds to S803. When it is determined that the value of the loop counter r is equal to or larger than the number T of items of the enlargement/reduction mode list, it determines that a fee is calculated for all the items of the enlargement/reduction mode list and proceeds the processing to S860.

S803: Fee calculation program 105 initializes the page counter i with "0" and initializes variable Pc storing the number of color pages and variable Pm storing the number of monochrome pages Pc for the items of the enlargement/reduction mode list for which the fee is calculated with "0."

S804: Fee calculation program 105 determines a value of enlargement/reduction mode ID of the enlargement/reduction mode to be a calculation target. When the value of the enlargement/reduction mode ID is "1" or "2," the processing at S810 is executed. When the value of the enlargement/reduction mode ID is "3," the processing at S820 is executed. When the value of the enlargement/reduction mode ID is "4," the processing at S840 is executed. Fee calculation program 105, having executed the processing at S810, S820, and S840, proceeds the processing to S802 and forms a loop. Note that the processing at S810, S820, and S840 is described later in detail.

S860: Fee calculation program 105 leaves the lower fee and deletes the higher fee from the enlargement/reduction mode list when the enlargement/reduction mode IDs are the same and the numbers of pages are the same. This is because a more effective option for each enlargement/reduction mode is provided for user P, and the option with a lower efficiency is deleted from the enlargement/reduction mode list.

S861: Fee calculation program 105 extracts a lowest fee from the items in the enlargement/reduction mode list and changes the minimum-fee flag of the item of the enlargement/reduction mode list to "1". Then, the processing is terminated. In this manner, fee calculation program 105 completes the enlargement/reduction mode list and enlargement/reduction display program 106 displays the enlargement/reduction mode setting screen on display 13 based on the completed enlargement/reduction mode list.

Next, fee calculation processing to be performed by the fee calculation program when the enlargement/reduction mode ID is "1" or "2" is described by referring to FIGS. 1 and 2 according to steps expressed by S in the drawings of the flowchart illustrating the flow of the fee calculation processing in the first embodiment in FIG. 16. Note that this fee calculation processing is performed at S810 of FIG. 15.

S811: Fee calculation program 105 compares the page counter i with the total number N of pages. When it is determined that the page counter i is smaller than the total number N of pages, this means that all the pages are not processed. Then, the processing proceeds to S812. When it is determined that the page counter i is equal to or larger than the total number N of pages, this means that all the pages are processed. Then, the processing proceeds to S816.

S812: Fee calculation program 105 determines whether or not the data of the i-th page is a color page. When it is determined that the data is a color page, the processing proceeds to S813. When it is determined that it is not a color page, i.e., a monochrome page, the processing proceeds to S814.

Here, the determination of color page is performed using a RGB (Red Green Blue) value which is color information designated for each data in the page data. Color information whose values of a R element, a G element, and a B element of the RGB value are equal to one another is dealt as monochrome information. Color information in which any of a R element, a G element, and a B element of the RGB value has a different value and is dealt with as color information. Fee calculation program 105 performs this determination processing for all the data in the page, and determines that a page having the color information is a color page and a page having only the monochrome information is a monochrome page.

S813: Fee calculation program 105 having been determined as the color page at S812 adds "1" to variable Pc storing the number of color pages and proceeds the processing to S815.

S814: On the other hand, fee calculation program 105 having been determined as the monochrome page at S812 adds "1" to variable Pm storing the number of monochrome pages and proceeds the processing to S815.

S815: Fee calculation program 105 adds "1" to the page counter i, and proceeds the processing to S811 to perform the processing on the next page.

S816: Fee calculation program 105, having determined that the page counter i is equal to or larger than the total number N of pages and having determined that all the pages are processed at S811, substitutes the value of variable Pc for the number of color pages of the r-th item of the enlargement/reduction mode list and substitutes the value of variable Pm for the number of monochrome pages. Furthermore, fee calculation program 105 adds the product of variable Pc and the color unit price to the product of variable Pm and the monochrome unit price, and substitutes the added value for fee Pr. Note that r is a loop counter. Here, the color unit price and the monochrome unit price are acquired by searching the charge setting list illustrated in FIG. 7 of charge setting 35 based on the determined printing paper size.

S817: Fee calculation program 105 adds "1" to the loop counter r in order to process the next items of enlargement/reduction mode list. Then, the processing is terminated.

Next, fee calculation processing to be performed by the fee calculation program when the enlargement/reduction mode ID is "3" is described by referring to FIGS. 1 and 2 according to steps expressed by S in the drawings of the flowchart illustrating the flow of the fee calculation processing in the first embodiment in FIG. 17. Note that this fee calculation processing is performed at S820 of FIG. 15.

S821: Fee calculation program 105 calculates the number I3 of pages in which one page is split in such a manner that Xr, which is X of the r-th item of the enlargement/reduction mode list, is multiplied by Yr, which is Y of the r-th item of the enlargement/reduction mode list.

S822: Fee calculation program 105 compares the page counter i with the total number N of pages. When it is determined that the page counter i is smaller than the total number N of pages, this means that all the pages are not processed. Then, the processing proceeds to S823. When it is determined that the page counter i is equal to or larger than the total number N of pages, this means that all the pages are processed. Then, the processing proceeds to S830.

S823: Fee calculation program 105 initializes counter i3 for sequentially processing page number $I_3$ in which one page is split to "0."

S824: Fee calculation program 105 compares the page counter $i_3$ with the number $I_3$ of split pages. When it is determined that the page counter $i_3$ is smaller than the number $I_3$ of split pages, this means that all the pages to be split for one document page are not processed. Then, the processing proceeds to S825. When it is determined that the page counter $i_3$ is equal to or larger than the number $I_3$ of split pages, this means that all the pages to be split for one document page are processed. Then, the processing proceeds to S829.

S825: Fee calculation program 105 determines whether or not the data of the i-th page is a color page. When it is determine that the data is a color page, the processing proceeds to S826. When it is determined that it is not a color page, i.e., a monochrome page, the processing proceeds to S827.

Here, process of determining whether it is the color page or the monochrome page is the same processing as that at S812 of FIG. 16. However, when the poster print function is used, the page is split. Accordingly, the determination is entirely performed on all the split regions. Fee calculation program 105 places the page data in the center of the size in which the paper having the r-th printing paper size of the enlargement/reduction mode list is arranged with X pages in the lateral direction and Y pages in the longitudinal direction, and checks whether the drawing data in the region of each paper size is color information or monochrome information.

S826: Fee calculation program 105, having been determined as the color page at S825, adds "1" to variable Pc storing the number of color pages and proceeds the processing to S828.

S827: On the other hand, fee calculation program 105, having been determined as the monochrome page at S825, adds "1" to variable Pm storing the number of monochrome pages and proceeds the processing to S828.

S828: Fee calculation program 105 adds "1" to the page counter $i_3$, and proceeds the processing to S824 to perform the processing on the next page in the poster print function.

S829: Fee calculation program 105, having determined that counter $i_3$ has a value equal to or larger than the number $I_3$ of split pages at S829, adds "1" to page counter i and proceeds the processing to S822 to process the next page.

S830: Fee calculation program 105, having determined that the page counter i is equal to or larger than the total number N of pages and having determined that all the pages are processed at S822, substitutes the value of variable Pc for the number of color pages of the r-th item of the enlargement/reduction mode list and substitutes the value of variable Pm for the number of monochrome pages. Furthermore, fee calculation program 105 adds the product of variable Pc and the color unit price to the product of variable Pm and the monochrome unit price and substitutes the added value for the fee Pr. Note that r is a loop counter. Here, the color unit price and the monochrome unit price are acquired by searching the charge setting list illustrated in FIG. 7 of charge setting 35 based on the determined printing paper size.

S831: Fee calculation program 105 adds "1" to the loop counter r in order to process the next items of enlargement/reduction mode list. Then, the processing is terminated.

Next, fee calculation processing to be performed by the fee calculation program when the enlargement/reduction mode ID is "4" is described by referring to FIGS. 1 and 2 according to steps expressed by S in the drawings of the flowchart illustrating the flow of the fee calculation processing in the first embodiment in FIG. 18. This fee calculation processing is performed at S840 of FIG. 15.

S841: Fee calculation program 105 calculates the number $I_4$ of pages to be compiled on one page in such a manner that Xr, which is X of the r-th item of the enlargement/reduction mode list, is multiplied by Yr, which is Y of the r-th item of the enlargement/reduction mode list.

S892: Fee calculation program 105 compares the page counter i with the total number N of pages. When it is determined that the page counter i is smaller than the total number N of pages, this means that all the pages are not processed. Then, the processing proceeds to S843. When it is determined that the page counter i is equal to or larger than the total number N of pages, this means that all the pages are processed. Then, the processing proceeds to S853.

S843: Fee calculation program 105 initializes counter $i_4$ for sequentially processing number $I_4$ of pages to be put together on one page and flag F indicating the color page to "0."

S844: Fee calculation program 105 compares the page counter $i_4$ with the number $I_4$ of compiled pages. When it is determined that the page counter $i_4$ is smaller than the number $I_4$ of compiled pages, this means that all the pages to be compiled for the printing paper size are not processed yet. Then, the processing proceeds to S845. When it is determined that the page counter $i_4$ is equal to or larger than the number $I_4$ of compiled pages, this means that all the pages to be compiled for the printing paper size are processed. Then, the processing proceeds to S849.

S845: Fee calculation program 105 determines whether or not the data of the i-th page is a color page. When it is determine that the data is a color page, the processing proceeds to S846. When it is determined that it is not a color page, i.e., a monochrome page, the processing proceeds to S847.

Here, the process of determining whether it is the color page or the monochrome page is the same processing as that at S812 of FIG. 16. However, when the N-up function is used, the pages are compiled. Accordingly, the determination is entirely performed on all the pages to be compiled. Accordingly, fee calculation program 105 checks whether each logic page to be compiled is color or monochrome.

S846: Fee calculation program 105, having determined that the page is a color page at S845, substitutes "1" for flag F.

S847: Fee calculation program 105 adds "1" to counter $i_4$.

S848: Fee calculation program 105 compares the value in which page counter i is added to counter $i_4$ with the value of the total number N of pages. When it is determined that the value in which page counter i is added to counter $i_4$ is smaller than the total number N of pages, this means that an unprocessed page exists. Thus, the processing proceeds to S899. When it is determined that the value in which counter i is added to counter $i_4$ is equal to or larger than the total number N of pages, this means that all the pages are processed. Thus, the processing proceeds to S849.

S849: Fee calculation program 105 determines whether or not flag F indicating that the entire page in which the multiple pages are compiled is a color page is "1." When it is determined that flag F is "1," the processing proceeds to S850, while when it is determined that flag F is no "1," the processing proceeds to S851.

S850: Fee calculation program 105, having determined that flag F is "1," i.e., the entire page in which multiple pages are compiled is a color page, adds "1" to variable Pc storing the number of color pages and proceeds the processing to S852.

S851: On the other hand, fee calculation program 105, having determined in S849 that flag F is not "1," i.e., the entire page in which multiple pages are compiled is a monochrome page, adds "1" to variable Pm storing the number of monochrome pages and proceeds the processing to S852.

S852: Fee calculation program 105 adds counter $I_4$ to the page counter i, and proceeds the processing to S842.

S853: Fee calculation program 105, having determined that the page counter i is equal to or larger than the total number N of pages and having determined that all the pages are processed at S842, substitutes the value of variable Pc for the number of color pages of the r-th item of the enlargement/reduction mode list and substitutes the value of variable Pm for the number of monochrome pages. Furthermore, fee calculation program 105 adds the product of variable Pc and the color unit price to the product of variable Pm and the monochrome unit price and substitutes the value for the fee Pr. Note that r is a loop counter. Here, the color unit price and the monochrome unit price are acquired by searching the charge setting list illustrated in FIG. 7 of charge setting 35 based on the determined printing paper size.

S854: Fee calculation program 105 adds "1" to the loop counter r in order to process the next items of the enlargement/reduction mode list. Then, the processing is terminated. As described above, in the first embodiment, when enlargement or reduction printing is designated, multiple different print modes for obtaining a print result with the same enlargement/reduction rate are displayed on a display together with a fee thereof to inform a user so that the user can select a print mode. Accordingly, such effect can be obtained that the user can select an optimum enlargement/reduction print mode by considering the fee among the provided multiple print modes.

Second Embodiment

FIG. 23 is a block diagram illustrating the configuration of an image formation apparatus in a second embodiment. Copier (copy machine) 200, as an image formation apparatus including an image processor configured to create print data and an image formation unit configured to charge for printing the print data, includes input unit 201, controller 202, display 203, image scanner 204, printer 205, paper storage 206, and storage 212.

Controller 202 includes, for example, a CPU and the like, and controls input unit 201, display 203, image scanner 204, and printer 205 based on various kinds of programs (software) stored in storage 212 to control an entire operation of copier 200. Input unit 201 is an operation button disposed on an operation panel, for example, to receive an input operation made by user P. Display 203 includes, for example, an LCD and a touch panel and is caused by control of controller 202 to display text or images on the screen.

Image scanner 204 is configured of an image read mechanism to read image depicted on the document as image data under the control of controller 202. Printer 205 is configured of a print function to print the image data of the document which is read by image scanner 204 onto printing paper. Paper storage 206 includes, for example, tray A207, tray B208, tray C209, tray D210, and tray E211, so as to be capable of respectively storing different sizes or kinds of printing media in the trays and supplying printer 205 with the printing media.

Storage 212 is configured of a memory or an HD, such as a RAM, for example, and a ROM which stores firmware as various programs for controlling copy machine 200, character font data, or the like. Storage 212 includes copy setting 213 and charge setting 214. Also, storage 212 has setting change program 215, charge setting acquisition program 216, enlargement/reduction mode list-up program 217, fee calculation program 218, enlargement/reduction mode display program 219, and page data creation program 220. As illustrated in FIG. 7, charge setting 214 as a charge setting list is configured of paper sizes which are stored in the trays A41 to E45 of paper storage 206 as paper storage trays, a color unit price as a color print unit price for color printing made on each paper size, and a monochrome print unit price for monochrome printing made on each paper size.

Setting change program 215 as an enlargement/reduction rate designation unit is an enlargement/reduction rate designation program to designate an enlargement/reduction rate to be used to create print data, a document paper size, and a printing paper size, and includes a function to provide user P with a GUI for setting the functions of copier 200 before the printing, such as the number of copies, the document paper size, the printing paper size, and the like in addition to the enlargement/reduction rate. This setting change program 215 acquires the settings from copy setting 213 to be reflected on the GUI when the GUI is displayed and stores the settings on the GUI in copy setting 213 when the GUI is ended. Copy setting 213 as print setting information is for storing setting values changed by setting change program 215, for example, an enlargement/reduction rate, which is an enlargement rate or a reduction rate, the number of copies, a document paper size, and a printing paper size as setting values.

Charging price setting acquisition program 216 as an information acquisition unit is an information acquisition program to acquire size information and unit price information of printing media to be stored in paper storage 206, and acquires charge setting 214. Enlargement/reduction mode list-up program 217 as an output mode extraction unit is an output mode extraction program to extract: output modes based on the enlargement/reduction rate designated in print setting changing program 215, the size information of the printing media acquired in charge setting acquisition program 216, and lists up the enlargement/reduction modes from the enlargement/reduction rate stored in copy setting 213, the paper size, and charge setting 214.

Fee calculation program 218 as a fee calculation unit is a fee calculation program to calculate a fee for each output mode extracted in the enlargement/reduction mode list-up program 217 in such a manner that the number of printing media to be used is calculated from the size information of the printing media acquired in the charge setting acquisition program 216 and then a fee is calculated from the number of printing media and unit price information acquired in charge setting acquisition program 216, and calculates a fee based on charge setting 214 for the enlargement/reduction mode listed up by enlargement/reduction mode list-up program 217.

Enlargement/reduction mode display program 219, as an output mode display, displays each fee calculated in fee calculation program 218 together with the output mode to accept a selection of the output mode, and displays on display 203 each enlargement/reduction mode listed up by enlargement/reduction mode list-up program 217, and the fee of each enlargement/reduction mode calculated in fee calculation program 218 to prompt user P to select the enlargement/reduction mode through input unit 201.

Page data creation program 220 as a print data creation unit is a print data creation program to create print data based on the output mode selected by enlargement/reduction mode display program 219, and creates page data from the image data of the document read by image scanner 204 as print data based on copy setting 213 and the enlargement/reduction mode selected by enlargement/reduction mode display program 219.

Effects of the above-described configuration are described.

Firstly, print (copy) processing to be performed by the copier as the image processing system is briefly described by referring to FIG. 23 according to steps expressed by S in the drawing of the flowchart illustrating the flow of the printing processing in the second embodiment in FIG. 24.

S1101: User P places a target document to be copied on image scanner 204 of copier 200.

Setting change program 215 in copier 200 displays currently-set contents on display 203 and performs print setting change processing to change copy setting 213 in storage 212 based on the print setting information inputted in input unit 201 through the operation of user P. Copy setting 213 is referred when the image data of the document is converted into print data.

S1102: Controller 202 accepts the operation of user P instructing copy through input unit 201 and starts copying.

S1103: Controller 202 performs page image scan processing to read an image depicted on the placed document by image scanner 204.

S1104: Controller 202 performs print data creation processing of the page image read by image scanner 204 to process and print the page image.

S1105: Printer 205 prints the created print data of the page image. At this time, print unit 205 performs printing after feeding the designated printing medium from paper storage 206 and the charges based on charge setting 214 stored in storage 212, and then the processing is terminated.

Next, print setting change processing to be performed by the setting change program of the copier is described by referring to FIG. 23 according to steps expressed by S in the drawing of the flowchart illustrating the flow of the print setting change processing in the second embodiment in FIG. 25. Note that this print setting change processing is performed at S1101 of FIG. 24.

S1201: Setting change program 215 acquires copy setting 213 including a document paper size, a printing paper size, and an enlargement/reduction rate from storage 212.

S1202: Setting change program 215 sets the acquired print setting as setting parameters for each item. For example, setting change program 215 sets "A9" as the setting parameter of the document paper size, and also sets "A4" as the setting parameter of the printing paper size, and sets "100%" as the setting parameter of the enlargement/reduction rate.

S1203: Setting change program 215 displays a GUI in which the setting parameter set at S1202 is reflected on display 13.

S1204: Setting change program 215 accepts the operation of changing the settings of the respective items, which is made by user P through input unit 201, and changes the settings of the items. For example, when the print data illustrated in FIG. 3 is copied, the document size is "A4" and thus setting change program 215 keeps the setting parameter of the document paper size at "A4." Then, since the enlargement/reduction rate is 191%, setting change program 215 changes the setting parameter of the printing paper size from "A4" to "A3," and the enlargement/reduction rate from "100%" to "141%."

S1205: Setting change program 215 saves the changed setting in copy setting 213.

S1206: Setting change program 215 displays termination of the print setting on the GUI. When it is determined that an "OK" button is pressed down in the GUI, the processing is terminated. When it is determined that a "Cancel" button other than the "OK" button is pressed down, the processing proceeds to S1204 and repeats the processing S1204 and 1205.

Next, print data creation processing to be performed by the copier is briefly described by referring to FIG. 23 according to steps expressed by S in the drawing of the flowchart illustrating the flow of the print data creation processing in the second embodiment in FIG. 26. Note that this print setting change processing is processing to be performed at S1104 of FIG. 24.

S1301: Charge setting acquisition program 216 acquires the document paper size, paper size names, widths, and heights of the printing paper size, and enlargement/reduction rates R(%) from copy setting 213.

S1302: Charge setting acquisition program 216 determines whether or not the acquired enlargement/reduction rate R is 100%. When it is determined that it is 100%, the enlargement/reduction is not performed, and thus the processing proceeds to S1313 to create page data having the designated setting. When it is determined that it is not 100%, the processing proceeds to S1303.

S1303: When it is determined that the acquired enlargement/reduction rate R is not 100%, fee acquisition program 216 acquires charge setting 214.

S1304: Charge setting acquisition program 216 acquires I which is the number of items of charge setting 214. As illustrated in FIG. 7, charge setting 214 is configured of paper sizes which are stored in trays A41 to E45 of paper storage 206 as paper storage trays, a color unit price as a color print unit price when color printing is made on each paper size, and a monochrome print unit price when monochrome printing is made on each paper size. Thus, the number I of the items can be acquired from the configuration. In the example illustrated in FIG. 7, the number I of the items is 5.

S1305: Charge setting acquisition program 216 checks a scan state of the target document to be copied. Here, the image data which is obtained by scanning each page of the document is delivered to page data creation program 220 after scanning all the pages to be copied without being delivered to page data creation program 220 to be processed. During this time, the image data which is obtained by scanning the document is stored in storage 212.

S1306: Charge setting acquisition program 216 proceeds the processing to S1305 until all the pages of the document are scanned. When the scanning is terminated, the processing proceeds to S1307. Note that the end of the scanning can be detected by a change in the state of the automatic document feeder of image scanner 209 from a state where paper is present to a state where paper is absent.

S1307: Charge setting acquisition program 216, detecting the end of the scanning, acquires the total number N of pages of the print data to be copied from the scanned print data.

S1308: Next, enlargement/reduction mode list-up program 217 creates an enlargement/reduction mode list. Note that the processing of creating the enlargement/reduction mode list is similar to the processing of FIGS. 11 to 14 in the first embodiment, and the description thereof is omitted.

S1309: Next, fee calculation program 218 calculates a fee for each item of the created enlargement/reduction mode list. Note that the processing of calculating the fee for each item of the enlargement/reduction mode list is same as the processing of FIGS. 15 to 18 in the first embodiment, except for the method of determining whether it is color or monochrome, and the description thereof is omitted. In the method of determining color or monochrome in the embodiment, when variations of the color information of all the image data are within a range of threshold for each of the RGB elements, it is determined as monochrome while when variations thereof are outside the threshold, it is determined as color.

Here, the variations mean differences among the RGB elements. For example, in the case of RGB (0, 0, 0) and RGB (128, 128, 128), the variation become "0" and in the case of RGB (126, 128, 130), the variation becomes "4."

S1310: Next, enlargement/reduction mode display program 219 displays the enlargement/reduction mode setting screen. Note that the enlargement/reduction mode setting screen is the same as that of the first embodiment.

S1311: Enlargement/reduction display program 219 accepts a selection operation of a desired enlargement/reduction mode by user P on the enlargement/reduction mode setting screen.

S1312: Enlargement/reduction mode display program 219 accepts an operation of terminating the enlargement/reduction mode setting screen by user P on the enlargement/reduction mode setting screen. When OK button 123 illustrated in FIG. 4 is pressed down, the selected enlargement/reduction mode is adopted for the page data creation processing. When cancel button 124 is pressed down, the selected enlargement/ reduction mode is not adopted for the page data creation processing but the enlargement/reduction mode designated in advance is adopted for the page data creation processing. At that time, enlargement/reduction mode display program 219 starts supplying the image data stored in storage 212 with page data creation program 220.

S1313: Page data creation program 220 adopts the selected or designated enlargement/reduction mode to create page data. Then, the processing is terminated.

As described above, in the second embodiment, in the copier, when enlargement or reduction copy is designated, multiple different print modes for obtaining a print result with the same enlargement/reduction rate are displayed on a display together with a fee thereof to inform a user so that the user can select a print mode. Accordingly, such effect can be obtained that the user can select an optimum enlargement/reduction print mode by considering the fee among the provided multiple print modes.

In the first embodiment and the second embodiment, an image processing system is described as a printer and a computer connected to the printer and a copier. However, the invention is not limited to these cases. For example, an image processing system may be a multifunction machine and a computer which is connected to the multifunction machine and has a facsimile function or a multifunction machine which has a copy function.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. An image processing system, comprising:
an image processor configured to create print data; and
an image formation unit configured to print the print data, wherein
the image processor includes
an enlargement/reduction rate designation unit configured to prompt a user to designate an enlargement/reduction rate to be used to create the print data,
an information acquisition unit configured to acquire size information and unit price information of a printing medium stored in the image formation unit,
an output mode extraction unit configured to extract output modes for printing the print data based on the designated enlargement/reduction rate and the size information of the printing medium acquired by the information acquisition unit,
a fee calculation unit configured to, for each of the output modes extracted by the output mode extraction unit, calculate a number of printing media to be used from the size information of the printing medium acquired by the information acquisition unit, and calculate a total fee to be paid for printing the print data on the printing media from the calculated number of printing media and the unit price information acquired by the information acquisition unit,
an output mode display unit configured to cause a display to display, on a single display screen, a plurality of candidates, each of the plurality of candidates having a respective one of the output modes, and each of the plurality of candidates having a respective one of the total fees that are calculated corresponding to the respective output modes by the fee calculation unit, and thereby prompt the user to select, by way of a user operation made on the single display screen, one of the output modes to be used for printing the print data on the printing media, and
a print data creation unit configured to create the print data based on the selected output mode,
wherein the plurality of candidates includes: a first candidate corresponding to a first value that has been selected by the user, and a second candidate corresponding to a second value that is different from the first value selected by the user.

2. The image processing system according to claim 1, wherein the output modes include an output mode of outputting on a printing medium with a designated size, an output mode of outputting on a printing medium with a size larger than a designated printing medium size, an output mode of outputting an enlarged image on multiple printing media, and an output mode of outputting multiple pages collectively on one printing medium.

3. The image processing system according to claim 1, wherein
the unit price information is unit price information for color or monochrome outputting, and
the fee calculation unit calculates the fee by determining whether the printing data is for a color or monochrome printing.

4. The image processing system according to claim 1, wherein
the image processor is an image processing apparatus, and
the image formation unit is an image formation apparatus which is connected with the image processing apparatus and is configured to print the print data received from the image processing apparatus.

5. The image processing system according to claim 1, wherein the image processor and the image formation unit are provided in a copier, and wherein the calculated number of printing media is greater than one.

6. The image processing system according to claim 1, wherein the image processor further includes a first input unit configured to accept the designation of the enlargement/reduction rate from the user.

7. The image processing system according to claim 1, wherein the image processor further includes a second input unit configured to accept the selection of the output mode from the user.

8. The image processing system according to claim 1, wherein the image processor further includes a controller configured to cause execution of image formation onto a medium with the selected output mode.

9. The image processing apparatus according to claim 8, wherein the controller causes execution of the image formation onto the medium with the output mode designated in advance when the designated enlargement/reduction rate is 100%.

10. The image processing system according to claim 1, wherein when color printing is to be utilized for one half of a print medium and when no color printing is to be utilized for another half of the print medium, the print data creation unit creates the print data based on the selected output mode such that the print data is printed on two separate print media using poster printing.

11. The image processing system according to claim 1, wherein when one of the output modes is selected by the user, the received print data is printed based on a print setting corresponding to the selected fee associated with the one of the output modes.

12. The image processing system according to claim 1, wherein each of the output modes utilizes a same number of print media for printing a print job, one of the output modes is automatically selected having a smallest fee associated therewith without any additional input from the user.

13. The image processing system according to claim 1, wherein the output mode extraction unit is configured to extract at least a first output mode and a second output mode,
wherein the output mode display unit is configured to cause the display to display, on a print preview region on the single display screen, a print output on a single print medium corresponding to one of the first output mode and the second output mode, based on a user selection of which of the first output mode and the second output mode is to be displayed on the print preview region,
the print preview region of the single display screen being separate from a fee display region in which the output modes and the total fees calculated corresponding to the respective output modes by the fee calculation unit are displayed.

14. An image processing method comprising:
an enlargement/reduction rate designation step of prompting a user to designate an enlargement/reduction rate to be used to create a print data,
an information acquisition step of acquiring size information and unit price information of a printing medium stored in an image formation unit,
an output mode extraction step of extracting output modes for printing the print data based on an enlargement/reduction rate designated at the enlargement/reduction rate designation step and the size information of the printing medium acquired at the information acquisition step,
a fee calculation step of, for each of the output modes extracted by the output mode extraction unit, calculating the number of printing media to be used from the size information of the printing medium acquired at the information acquisition step, and calculating a total fee to be paid for printing the print data on the printing media from the calculated number of printing media and the unit price information acquired at the information acquisition step,
an output mode display step of displaying, on a single display screen, a plurality of candidates each of the plurality of candidates having a respective one of the output modes, and each of the plurality of candidates having a respective one of the total fees that are calculated corresponding to the respective output mode at the fee calculation step, and thereby prompting the user to select, by way of a user operation made on single the display screen, one of the output modes, and
a print data creation step of creating the print data based on the output mode selected at the output mode display step,
wherein the plurality of candidates includes: a first candidate corresponding to a first value that has been selected by the user, and a second candidate corresponding to a second value that is different from the first value selected by the user.

15. The image processing method according to claim 14, wherein when color printing is to be utilized for one half of a print medium and when no color printing is to be utilized for another half of the print medium, the print data is created by the print data creation step based on the selected output mode such that the print data is printed on two separate print media using poster printing.

16. The image processing method according to claim 14, wherein when one of the output modes is selected by the user, the received print data is printed based on a print setting corresponding to the selected fee associated with the one of the output modes.

17. The image processing method according to claim 14, wherein each of the output modes utilizes a same number of print media for printing a print job, one of the output modes is automatically selected having a smallest fee associated therewith without any additional input from the user.

18. The image processing method according to claim 14, wherein the output mode extraction step causes the display to display, on a print preview region on the single display screen, a print output on a single print medium corresponding to one of the first output mode and the second output mode, based on a user selection of which of the first output mode and the second output mode is to be displayed on the print preview region,
the print preview region of the single display screen being separate from a fee display region in which the output modes and the total fees calculated corresponding to the respective output modes by the fee calculation step are displayed.

19. An information processor, comprising:
a first input unit configured to receive a designation of an enlargement/reduction rate;
an extraction unit configured to extract a first output setting for printout of print data at the designated enlargement/reduction rate and a second output setting different from the first output setting for printout of the print data at the designated enlargement/reduction rate;
a calculation unit configured to calculate a first fee corresponding to printout of the print data for the first output setting and a second fee corresponding to printout of the print data for the second output setting;
a display configured to display, on a single display screen, i) a first print candidate having the first output setting and having the first fee in association with each other, and ii) a second candidate, having the second output setting and having the second fee in association with each other, the first fee and the second fee corresponding to total print fees and being calculated based on a size of the print data to be printed and the respective first output setting and the second output setting,
a second input unit configured to receive a selection, via a user operation made on the single display screen, of one of the first output setting and the second output setting; and
a controller configured to cause an execution of image formation onto a medium with the output setting selected through the second input unit,
wherein the a first print candidate corresponds to a first value that has been selected by the user, and the second print candidate corresponds to a second value that is different from the first value selected by the user.

20. The information processor according to claim 19, wherein the controller causes execution of the image formation onto the medium with the output setting designated in advance when the designated enlargement/reduction rate is 100%.

21. The information processor according to claim 19, wherein when color printing is to be utilized for one half of a print medium and when no color printing is to be utilized for another half of the print medium, the print data is created by the print data creation step based on the selected output mode such that the print data is printed on two separate print media using poster printing.

22. The information processor according to claim 19, wherein when one of the first and second output settings is selected by the user, the received print data is printed based on a print setting corresponding to the selected fee associated with the one of the first and second output settings.

23. The information processor according to claim 19, wherein when both the first and second output settings utilizes a same number of print media for printing a print job, one of the first and second output settings is automatically selected having a smallest fee associated therewith without any additional input from the user.

24. The information processor according to claim 19, wherein the output mode extraction unit is configured to extract at least a first output mode and a second output mode,
   wherein the output mode display unit is configured to cause the display to display, on a print preview region on the single display screen, a print output on a single print medium corresponding to one of the first output mode and the second output mode, based on a user selection of which of the first output mode and the second output mode is to be displayed on the print preview region,
   the print preview region of the single display screen being separate from a fee display region in which the output modes and the total fees calculated corresponding to the respective output modes by the calculation unit are displayed.

* * * * *